US009891135B2

(12) United States Patent
Aki

(10) Patent No.: US 9,891,135 B2
(45) Date of Patent: Feb. 13, 2018

(54) FAULT DETECTION SYSTEM FOR ACTUATOR

(71) Applicant: SMC CORPORATION, Chiyoda-ku (JP)

(72) Inventor: Tomohiko Aki, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 523 days.

(21) Appl. No.: 14/313,199

(22) Filed: Jun. 24, 2014

(65) Prior Publication Data

US 2015/0007713 A1 Jan. 8, 2015

(30) Foreign Application Priority Data

Jul. 8, 2013 (JP) ................................ 2013-142556

(51) Int. Cl.

| | |
|---|---|
| ***F15B 19/00*** | (2006.01) |
| ***G01M 13/00*** | (2006.01) |
| ***F15B 15/28*** | (2006.01) |

(52) U.S. Cl.

CPC ......... *G01M 13/00* (2013.01); *F15B 15/2815* (2013.01); *F15B 19/005* (2013.01); *F15B 2211/6336* (2013.01); *F15B 2211/7653* (2013.01); *F15B 2211/857* (2013.01); *F15B 2211/864* (2013.01)

(58) Field of Classification Search

CPC ....................... F15B 19/005; F15B 2211/8636
See application file for complete search history.

(56) References Cited

U.S. PATENT DOCUMENTS

| | | | | |
|---|---|---|---|---|
| 5,939,625 A | 8/1999 | Torii et al. | | |
| 6,386,229 B1 * | 5/2002 | Morikawa | ............. | F15B 19/005 137/552 |

FOREIGN PATENT DOCUMENTS

| | | | |
|---|---|---|---|
| JP | 9-330119 | A | 12/1997 |
| JP | 10-281113 | A | 10/1998 |
| JP | 11-272332 | A | 10/1999 |
| JP | 11-345148 | A | 12/1999 |
| JP | 2002-174358 | A | 6/2002 |
| JP | 2004-11722 | A | 1/2004 |
| JP | 2005-186822 | A | 7/2005 |
| JP | 2007-010106 | | 1/2007 |

OTHER PUBLICATIONS

Office Action dated Aug. 18, 2015 in Japanese Patent Application No. 2013-142556 (with English language translation of pertinent portion).
Office Action dated Mar. 15, 2016 in Japanese Patent Application No. 2013-142556 (with partial English language translation).
Chinese Office Action dated Mar. 7, 2017 in Chinese Patent Application No. 201410314711.6 w/English translation.

* cited by examiner

*Primary Examiner* — F. Daniel Lopez
(74) *Attorney, Agent, or Firm* — Oblon, McClelland, Maier & Neustadt, L.L.P.

(57) ABSTRACT

A failure detecting device of a fault detection system includes a detection time calculator, which calculates a stroke time T3 required for a piston to travel between one end and another end of an actuator based on detection signals from a first sensor and a second sensor, a statistical processor that performs a predetermined statistical calculation with respect to the stroke time T3, and a fault response detector, which detects whether or not a fault of the actuator has occurred based on a processing result of the statistical processor.

10 Claims, 10 Drawing Sheets

FAULT DETECTION SYSTEM FOR ACTUATOR

CROSS-REFERENCE TO RELATED APPLICATION

This application is based upon and claims the benefit of priority from Japanese Patent Application No. 2013-142556 filed on Jul. 8, 2013, the contents of which are incorporated herein by reference.

BACKGROUND OF THE INVENTION

Field of the Invention

The present invention relates to a fault detection system for detecting an abnormality of an actuator, based on a movement time of a movable member in the actuator.

Description of the Related Art

With an actuator in which a movable member is displaced upon supply of a pressure fluid (e.g., a pressurized gas), maintenance typically is carried out prior to the occurrence of a fault, when the frequency of use or a number of operations (operating time, duration of use) thereof reaches a given empirically determined level.

However, conventionally, even with a normal actuator that is not currently suffering from deterioration, under routine maintenance, replacement of the actuator may take place unnecessarily, leading to an increase in costs. Further, in the market, it has been sought to enhance productivity of equipment in which the actuator is used, and to reduce the cost of products made by such equipment, by shortening the stroke time (tact) and thereby increasing the tact time of the movable actuator. For this purpose, it is desirable for the maintenance interval not to be set based on the judgment of an operator, but rather for the actuator to be managed automatically and numerically.

Further, in general, it is thought that deterioration of an actuator in which a pressure fluid is used occurs due to load conditions applied to the actuator, or time-based variations, i.e., aging, of a fluid pressure device such as pneumatic device or the like in which the actuator is included. Furthermore, assuming that the occurrence of a fault in the actuator can be detected prior to a failure of the actuator due to deterioration caused by changes in the tact time, the fluid pressure device can continue to be used until just prior to the end of its life cycle, thereby enabling the equipment to be operated with maximum efficiency.

Thus, instead of carrying out maintenance operations based on frequency of use or a number of operations (operating time, duration of use), various types of fault detection systems, which are equipped with a failure prediction function for detecting a fault or abnormality of the actuator automatically and numerically, have been proposed.

For example, FIG. 9 illustrates a fault detection system 100 in which a fault of an actuator is detected by measuring variations in the flow rate and pressure of a pressure fluid. In such a fault detection system 100, a pressure fluid is supplied selectively to an actuator 106 from a fluid pressure source 102 through a directional switching valve 104. In the interior of the actuator 106, which comprises a cylinder, a piston 110 to which there is connected a piston rod 108 is displaced in left and right directions of FIG. 9 between one end 116 and another end 118 of the actuator 106.

The directional switching valve 104 comprises a 4-way 5-port single-acting solenoid valve having a solenoid 112 and a spring 114. More specifically, when the solenoid 112 is actuated by supplying an external control signal (operation command), the directional switching valve 104 supplies pressure fluid from the fluid pressure source 102 to the one end 116 of the actuator 106 through a port 120, whereas the fluid (pressure fluid) at the other end 118 of the actuator 106 is discharged to the exterior through a port 122. As a result, the piston 110 is displaced from the one end 116 to the other end 118.

On the other hand, when supply of the control signal is stopped, under operation of the spring 114, the directional switching valve 104 supplies the pressure fluid from the fluid pressure source 102 to the other end 118 through the port 122, whereas the pressure fluid at the one end 116 is discharged to the exterior through the port 120. As a result, the piston 110 is displaced from the other end 118 to the one end 116.

Further, at an intermediate location of tubes 123, 125 that serve to connect the directional switching valve 104 and the ports 120, 122, couplings 124, 126 are arranged respectively, which are constituted by parallel-connected throttle and check valves.

In this case, as shown by the dashed-line arrows in FIG. 9, there is a possibility of the pressure fluid to leak from respective portions of the fault detection system 100. More specifically, external leakage of pressure fluid can take place (1) from the respective tubes 123, 125, 127 that are arranged between the fluid pressure source 102, the directional switching valve 104 and the actuator 106, (2) from the directional switching valve 104, (3) from the piston rod 108 and from a non-illustrated packing provided between the cylinder and the piston rod 108, and (4) from the couplings 124, 126. Further, in the interior of the actuator 106 as well, there is a possibility for pressure fluid to leak between the one end 116 and the other end 118 via the piston 110 and a non-illustrated packing provided between the cylinder and the piston 110.

Thus, in the fault detection system 100, non-illustrated flow meters and pressure gauges are arranged in each of the tubes 123, 125, 127, whereby the flow rate of the pressure fluid is measured by the respective flow meters, and the pressure of the pressure fluid is measured by the respective pressure gauges. Consequently, since variations in the flow rate and pressure of the pressure fluid can be measured, faults at locations where the pressure fluid leaks can be detected, and replacement of the affected components prior to a failure thereof can be performed.

On the other hand, the fault detection system 130 of FIG. 10 detects an abnormality of an actuator 106 based on the stroke time of a piston 110. In addition to the respective constituent elements of the aforementioned fault detection system 100, the fault detection system 130 further includes a controller 132 such as a PLC (Programmable Logic Controller) or the like for supplying control signals to the solenoid 112 from an output 132*a*, a first sensor 134 arranged on the one end 116 of the actuator 106, and a second sensor 136 arranged on the other end 118 of the actuator 106. The couplings 124, 126 referred to above (see FIG. 9) are not provided in the fault detection system 130. Further, in the fault detection system 130, a silencer 138 is arranged in a discharge passageway for the pressure fluid, which is discharged from the one end 116 and the other end 118 of the actuator 106.

The first sensor 134 detects the piston 110 upon displacement thereof to the one end 116. The second sensor 136 detects the piston 110 upon displacement thereof to the other end 118. Detection signals indicative of detection results of the piston 110 by the first sensor 134 and the second sensor 136 are input to an input 132*b* of the controller 132. Thus, in the controller 132, a time (stroke time of the piston 110), from an output time at which the control signal is output to the directional switching valve 104, until an input time, at which the detection signal is input (i.e., a time at which displacement of the piston 110 is completed), is measured, and based on the measured stroke time, an abnormality of the actuator 106 is detected.

Further, similar to the fault detection system 130 of FIG. 10, techniques for detecting abnormalities of an actuator by using the stroke time of a movable member of the actuator are disclosed in Japanese Laid-Open Patent Publication No. 10-281113 (hereinafter referred to as Patent Document 1) and Japanese Laid-Open Patent Publication No. 2002-174358 (hereinafter referred to as Patent Document 2).

As disclosed in Patent Document 1, a velocity and a stroke time from initiation of an operation command of an actuator and a driven body are measured. The measured velocity and stroke time are compared with a reference velocity and stroke time during normal operation, and a judgment is made as to whether the actuator and the driven body are functioning normally.

As disclosed in Patent Document 2, a time from energization of a solenoid valve until the piston of a double-acting cylinder reaches a stroke end is measured as a stroke time, and a warning is issued if the measured stroke time becomes equal to or greater than a predetermined threshold value.

SUMMARY OF THE INVENTION

However, with the fault detection system 100 shown in FIG. 9, it is necessary for a fault such as deterioration or the like to be detected in a condition in which the equipment as a whole including the actuator 106 thereof is temporarily stopped. In other words, an abnormality of the actuator 106 cannot be detected during ongoing operation of the equipment. Accordingly, with the fault detection system 100, there is a concern that productivity of the equipment will be reduced as a result of maintenance operations carried out thereon.

Further, with the fault detection system 130 shown in FIG. 10, through a combination of the controller 132, the first sensor 134, and the second sensor 136, the responsiveness of the actuator 106 (stroke time or travel time of the piston 110) is measured. As a result, it is possible for faults of the actuator 106 to be detected during operation of the equipment. In this case, the accuracy of the response depends on the processing speed of the controller 132. For this reason, in the event that a fault of a small sized actuator 106 which operates at high speed is to be detected, it is necessary to construct a measurement system including a controller 132 having a high processing speed, thus increasing the cost of the system. Further, since a PLC is used in the controller 132, it is necessary for a user (operator) to construct the fault detection system 130, as well as to create the controller program used by the PLC, which increases the burden on the operator.

Additionally, in the case that plural actuators are used in one set of equipment, the user must create controller programs for measuring the stroke times of all of the actuators, and set such programs in the PLC, which is time consuming. Further, since a large capacity memory and a PLC with advanced programming capabilities are needed for storing the controller programs and the measurement results, construction of the fault detection system 130 tends to be expensive.

Moreover, in the techniques disclosed in Patent Document 1 and Patent Document 2, similar problems to those of the fault detection system 130 of FIG. 10 are raised.

The present invention seeks to resolve the aforementioned problems, and has the object of providing a fault detection system for an actuator, in which maintainability of the fault detection system can be enhanced, by easily detecting faults of the actuator without requiring stoppage of the equipment.

The fault detection system for an actuator according to the present invention enables detection of faults of the actuator based on a stroke time of a movable member of the actuator. The fault detection system includes the following first through ninth features.

More specifically, according to the first feature, the fault detection system is equipped with a first sensor, a second sensor, and a fault detecting device. The first sensor is disposed on one end of the actuator along a displacement direction of the movable member, and detects the movable member upon displacement thereof to the one end. The second sensor is disposed on another end of the actuator along the displacement direction, and detects the movable member upon displacement thereof to the other end.

The fault detecting device detects a fault of the actuator based on detection results of the first sensor and the second sensor.

More specifically, the fault detecting device further includes a stroke time calculator, a statistical computation processing unit, and a fault detector. The stroke time calculator calculates a stroke time required for the movable member to travel between the one end and the other end, based on each of the detection results. The statistical computation processing unit performs a predetermined statistical calculation with respect to the calculated stroke time. The fault detector detects whether or not a fault of the actuator has occurred, based on a processing result of the statistical computation processing unit.

According to the above-described first feature, the statistical calculation is carried out with respect to the stroke time of the movable member, and based on the processing result it is detected whether or not a fault of the actuator has occurred. Therefore, even during operation of equipment including the actuator, a fault of the actuator can be detected without requiring the equipment to be stopped. As a result, productivity of such equipment is maintained, and faults of the actuator can be detected in real time while the equipment remains online.

Further, a maintenance cycle, which heretofore has been set (defined) based on the operator's judgment, can be managed automatically and numerically. More specifically, even if maintenance operations are not carried out regularly by the operator, the fault detection system carries out maintenance automatically during operation of the equipment, and based on the stroke time, which serves as response information from the actuator, the occurrence of abnormalities of the actuator are determined easily. In addition, with the fault detection system, based on the processing result of the statistical calculation carried out with respect to the stroke time of the movable member, whether or not an abnormality of the actuator has occurred can be judged (managed) numerically.

As a result, according to the present invention, the number of processing steps required for maintenance can be reduced, the burden imposed on the operator can be mitigated significantly, and maintainability of the equipment including the actuator can be enhanced. Further, by being managed numerically, training and education of the operator in charge of such maintenance is facilitated.

Furthermore, since the stroke time of the movable member is calculated based on the detection results of the first sensor and the second sensor, existing sensors can be used without modification. More specifically, the fault detection system can be constructed merely by adding the fault detecting device with respect to conventional existing sensors. Accordingly, with the present invention, faults of the actuator can be detected easily and at low cost.

In the second feature of the present invention, the fault detecting device further includes a first storage unit in which the stroke time is stored, and a second storage unit in which the processing result is stored. In this case, preferably, the fault detector reads out at least the processing result that is stored in the second storage unit, and detects whether or not a fault of the actuator has occurred based on the read out processing result.

According to the second feature, since stroke times are stored (accumulated) in the first storage unit, even in the case that the movable member travels (moves reciprocally) between the one end and the other end, the statistical computation processing unit can sequentially read out the stroke times from the first storage unit, and carry out the statistical calculation thereon. Further, since processing results are stored (accumulated) in the second storage unit, the fault detector can suitably read out the processing results from the second storage unit, and carry out a detection process thereon.

In the third feature of the present invention, a normal stroke time of the movable member preferably is stored beforehand as a normal value in the first storage unit. In this case, the statistical computation processing unit calculates at least a deviation between the stroke time calculated by the stroke time calculator and the normal value, and stores the calculated deviation as a statistically calculated value in the second storage unit. Further, the fault detector reads out the statistically calculated value from the second storage unit, and judges whether or not a fault of the actuator has occurred based on the read out statistically calculated value.

According to the third feature, based on a comparison between the normal value, which is set beforehand, and the actually calculated stroke time, since it can be determined whether or not a fault of the actuator has occurred, the occurrence of a fault of the actuator can be judged accurately. More specifically, if the actuator becomes deteriorated, each time that the stroke time is calculated based on the respective detection results of the first sensor and the second sensor, the variability in the aforementioned deviation becomes greater. Thus, for example, if the deviation becomes greater than a predetermined threshold, it can easily be judged that a fault of the actuator has occurred.

Moreover, the normal stroke time of the movable member is defined as a stroke time of the movable member between the one end and the other end, in a state in which an abnormality such as deterioration or failure of the actuator is not occurring (e.g., an initial operating state of the actuator immediately after installation or replacement thereof). The normal stroke time may be set beforehand by an operator, or may be stored in the first storage unit at the time that the fault detecting device is manufactured.

Further, instead of the third feature, the fault detecting device can be configured to include the fourth feature of the invention, as noted below.

More specifically, according to the fourth feature, in the case that the first sensor and the second sensor detect the movable member each time that the movable member moves in the displacement direction, the stroke time calculator calculates and stores the stroke time in the first storage unit each time that respective detection results from the first sensor and the second sensor are input.

In this case, each time that the stroke time calculator calculates and stores the stroke time in the first storage unit, the statistical computation processing unit reads out data of all of the stroke times that are stored in the first storage unit, calculates an average value, a standard deviation, or a variance of the read out data, and stores the average value, the standard deviation, or the variance as a statistically calculated value in the second storage unit.

Additionally, it is preferable that an average value, a standard deviation, or a variance of a normal stroke time of the movable member is stored as a normal value in the second storage unit.

Consequently, each time that the statistical computation processing unit stores the statistically calculated value in the second storage unit, the fault detector reads out the statistically calculated value and the normal value from the second storage unit, and can detect whether or not a fault of the actuator has occurred based on a comparison between the statistically calculated value and the normal value.

Thus, according to the fourth feature, whether or not a fault of the actuator has occurred can be detected easily and in real time during operation of the actuator (i.e., during a time that the movable member moves reciprocally back and forth along the direction of displacement). More specifically, using actually calculated data of the stroke time, the statistical computation processing unit sequentially calculates an average value, a standard deviation, or a variance of the data, and stores the same as a statistically calculated value in the second storage unit. Further, based on a comparison between the statistically calculated value and the normal value that are stored in the second storage unit, the fault detector can judge sequentially whether a fault of the actuator has occurred.

Furthermore, if the actuator becomes deteriorated, each time that the stroke time is calculated based on the respective detection results of the first sensor and the second sensor, the variability in the aforementioned average value, the standard deviation, or the variance becomes greater. Thus, for example, if the average value, the standard deviation, or the variance becomes greater than a predetermined threshold, it can easily be judged that a fault of the actuator has occurred.

The fifth feature specifies in greater detail certain structural components of the fourth feature. More specifically, in the fifth feature, in the case that the movable member is moved reciprocally along the displacement direction at a fixed time period from an initial state of operation of the actuator, the stroke time calculator calculates the stroke time of the movable member and stores the calculated stroke time in the first storage unit, each time that respective detection results from the first sensor and the second sensor are input.

In this case, the statistical computation processing unit reads out the data of all of the stroke times that are stored in the first storage unit, calculates an average value, a standard deviation, or a variance of the read out data, and stores the average value, the standard deviation, or the variance as a normal value in the second storage unit.

According to the fifth feature, in an initial state of operation immediately after installation or replacement of the actuator in the equipment, the normal value is calculated automatically, and is stored in the second storage unit. Thus, setting of the normal value can be performed with high efficiency.

The sixth feature specifies in greater detail the second through fifth features of the present invention.

More specifically, in the sixth feature, the fault detection system further comprises a directional switching valve that selectively supplies a pressure fluid to the one end or the other end of the actuator, based on an external control signal supplied thereto. In this case, in accordance with the selective supply of the pressure fluid, the movable member is displaced in the displacement direction to the one end or the other end of the actuator.

In addition, the stroke time calculator calculates as the stroke time of the movable member a time difference between a first detection time from start of supply of the control signal to the directional switching valve until a time at which the movable member can no longer be detected by one of the first sensor and the second sensor, and a second detection time from the start of supply until a time at which detection of the movable member by the other of the first sensor and the second sensor is started.

According to the sixth feature, by calculating as the stroke time the time difference between the first detection time and the second detection time, the stroke time can be calculated easily and reliably.

In the seventh feature, the stroke time calculator stores the first detection time, the second detection time, and the stroke time in the first storage unit. Further, the statistical computation processing unit performs a predetermined statistical calculation with respect to the first detection time, and stores a processing result of the statistical calculation in the second storage unit. Consequently, the fault detector reads out the processing result with respect to the first detection time that is stored in the second storage unit, and based on the read out processing result, is capable of detecting whether or not a fault has occurred at a location between the directional switching valve and the actuator.

In this manner, according to the seventh feature, in addition to detecting a fault of the actuator, a fault that occurs between the directional switching valve and the actuator can be detected. The statistical calculation performed with respect to the first detection time may be the same process (calculation of an average value, a standard deviation, or a variance) as the statistical calculation performed with respect to the stroke time.

In the eighth feature of the invention, the fault detection system further comprises a controller that supplies the control signal to the directional switching valve. In this case, the fault detecting device further includes an output processor that supplies the control signal from the controller to the directional switching valve, and outputs the detection result of the fault detector to the controller.

According to the eighth feature, the controller, which is made up from a PLC or the like, supplies the control signal to the directional switching valve through the fault detecting device, whereas the controller receives the detection result from the fault detecting device. As a result, the controller is capable of grasping (detecting) a fault of the actuator in an online state, and based on the detection result, can take an appropriate action such as stopping supply of the control signal.

Further, in the fault detecting device, a malfunction of the actuator is detected, and the detection result alone is output to the controller. Therefore, it is unnecessary for the operator to create a control program for use by the controller in order to detect a malfunction of the actuator. As a result, the load imposed on the operator to construct the fault detection system can be reduced.

In the ninth feature of the invention, the fault detection system further includes a display device that displays the stroke time stored in the first storage unit, the processing result stored in the second storage unit, and the detection result of the fault detector.

In accordance with the ninth feature, by visually confirming the content displayed on the display device, the operator can grasp the occurrence of a fault of the actuator, and can quickly carry out an appropriate action such as halting operation of the equipment, replacing the actuator, etc.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a fault detection system for an actuator according to the present invention will be described in detail below with reference to the accompanying drawings.

[Overall Configuration of Fault Detection System]

Figure 1:
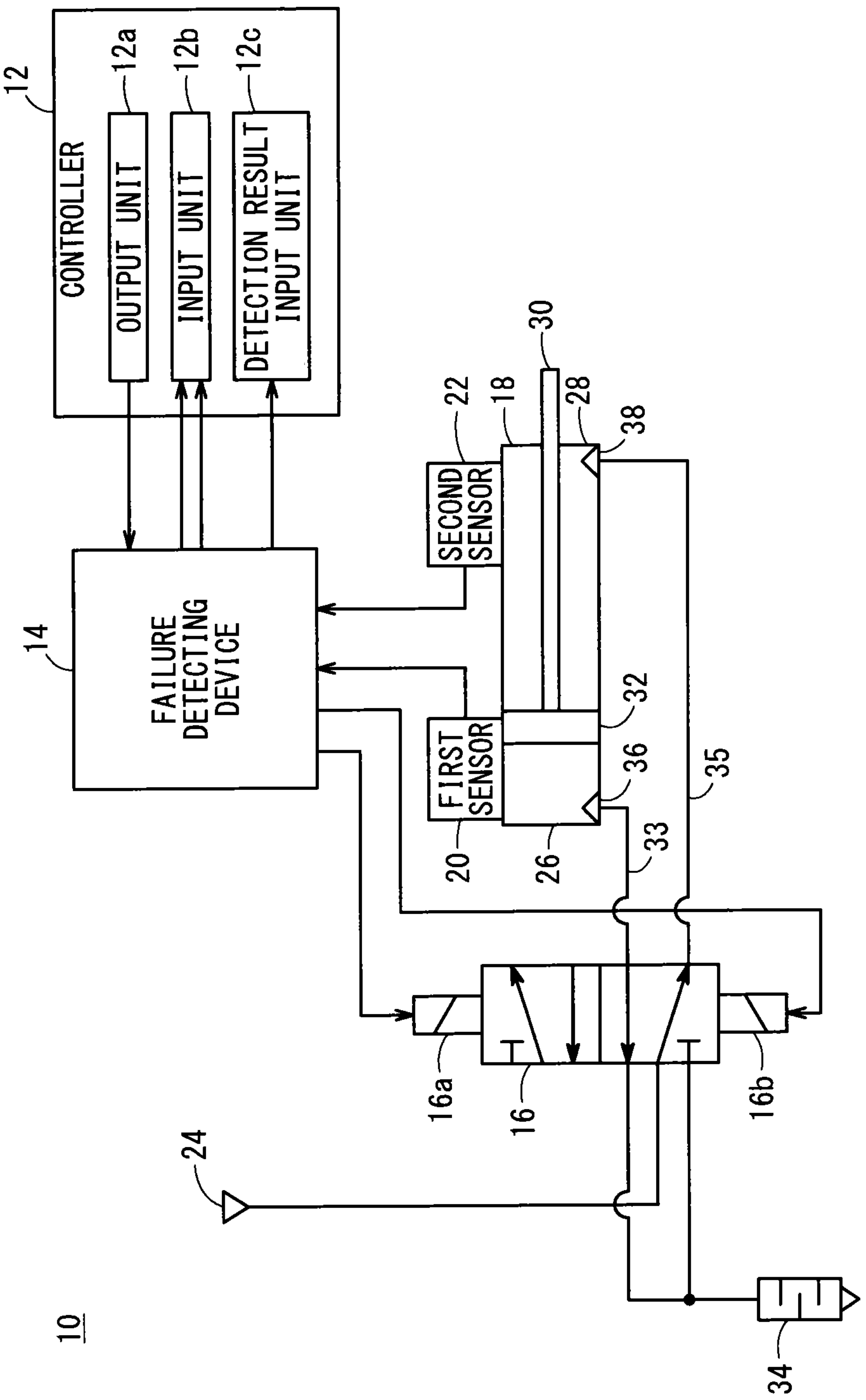
FIG. 1 is a schematic diagram of a fault detection system for an actuator according to an embodiment of the present invention.

As shown in FIG. 1, a fault detection system 10 for an actuator according to the present embodiment (hereinafter referred to as a fault detection system 10 according to the present embodiment) is equipped with a controller 12 such as a PLC or the like, a failure detecting device 14 (fault detecting device), a directional switching valve 16 comprising a 4-way, 5-port double-acting solenoid valve, an actuator 18 such as a fluid pressure cylinder or the like, and a first sensor 20 (first sensor) and a second sensor 22 (second sensor), which are arranged on an outer circumferential surface of the actuator 18.

The fault detection system 10 is incorporated in non-illustrated equipment to make up a system that is equipped with a failure prediction function, which is capable of automatically detecting a fault such as deterioration or failure of the actuator 18, etc., during operation of the equipment (i.e., during manufacturing of products) without requiring stoppage of the equipment.

The controller 12 includes an output unit 12*a*, an input unit 12*b*, and a detection result input unit 12*c*. The output unit 12*a* supplies control signals (control commands) to solenoids 16*a*, 16*b* of the directional switching valve 16 through the failure detecting device 14. Detection signals, which are indicative of the detection results produced by the first sensor 20 and the second sensor 22, are input through the failure detecting device 14 to the input unit 12*b*. A detection signal, which is indicative of the occurrence or non-occurrence (detection result) of a fault of the actuator 18 that is judged based on respective detection signals in the failure detecting device 14, is input to the detection result input unit 12*c*.

The directional switching valve 16, by means of control signals supplied from the controller 12 through the failure detecting device 14 to the solenoids 16*a*, 16*b*, selectively outputs or supplies a pressure fluid, which is supplied from a fluid pressure source 24, to one end 26 or another end 28 of the actuator 18. More specifically, if the control signal is supplied to the solenoid 16*a*, among the two blocks shown for the directional switching valve 16 in FIG. 1, the directional switching valve 16 is placed in a state in which the upper side block is selected. Further, if the control signal is supplied to the solenoid 16*b*, the directional switching valve 16 is placed in a state in which the lower side block is selected.

As discussed previously, the actuator 18 comprises a fluid pressure cylinder in which a piston 32 (movable member), to which a piston rod 30 is connected, is displaced in directions to the left and right (displacement direction) of FIG. 1, by supplying the pressure fluid from the directional switching valve 16.

As noted above, when the control signal is supplied to the solenoid 16*a*, thereby exciting the solenoid 16*a*, the directional switching valve 16 is placed in a state in which the upper side block is selected. Consequently, pressure fluid from the fluid pressure source 24 is supplied through the directional switching valve 16, a tube 33 and a port 36 to the one end 26 of the actuator 18, together with the pressure fluid in the other end 28 being discharged to the exterior from the other end 28 through a port 38, a tube 35, and the directional switching valve 16. As a result, the piston 32 and the piston rod 30 are displaced in unison from the one end 26 to the other end 28.

Further, when the control signal is supplied to the solenoid 16*b*, thereby exciting the solenoid 16*b*, the directional switching valve 16 is placed in a state in which the lower side block is selected. Consequently, pressure fluid from the fluid pressure source 24 is supplied through the directional switching valve 16, the tube 35 and the port 38 to the other end 28 of the actuator 18, together with the pressure fluid in the one end 26 being discharged to the exterior from the one end 26 through the port 36, the tube 33, and the directional switching valve 16. As a result, the piston 32 and the piston rod 30 are displaced in unison from the other end 28 to the one end 26.

Accordingly, by supplying control signals from the controller 12 alternately to the solenoid 16*a* and the solenoid 16*b* through the failure detecting device 14, the piston 32 and the piston rod 30 can be moved reciprocally between the one end 26 and the other end 28 in the left and right directions of FIG. 1.

A silencer 34 is disposed on a tip end of the discharge passageway for the pressure fluid that extends from the one end 26 or the other end 28.

The first sensor 20 is disposed on an outer circumferential surface on the one end 26 side of the fluid pressure cylinder that makes up the actuator 18, whereas the second sensor 22 is disposed on an outer circumferential surface on the other end 28 side of the fluid pressure cylinder. The first sensor 20 and the second sensor 22 are constituted by limit switches or magnetic switches, which detect the piston 32 when the piston 32 is displaced to positions confronting the first sensor 20 and the second sensor 22, and output detection results as detection signals to the failure detecting device 14. Further, by displacement of the piston 32, when the piston 32 is not located in confronting relation to the first sensor 20 and the second sensor 22, output of the detection signals from the first sensor 20 and the second sensor 22 is stopped.

As will be described later, using the detection signals from the first sensor 20 and the second sensor 22, the failure detecting device 14 calculates the stroke time of the piston 32 as the piston 32 travels between the one end 26 and the other end 28, and based on the calculated stroke time, the failure detecting device 14 detects the occurrence or non-occurrence of a fault such as deterioration or failure, etc., of the actuator 18. Additionally, the failure detecting device 14 outputs a detection result, which is indicative of the occurrence of a fault in the actuator 18, as a detection signal to the detection result input unit 12*c*. More specifically, the failure detecting device monitors in real time the control signal supplied from the controller 12 as well as the respective detection signals output from the first sensor 20 and the second sensor 22, such that during operation of the equipment, a detection process for detecting a fault of the actuator 18, etc., can be carried out continuously.

Figure 2:
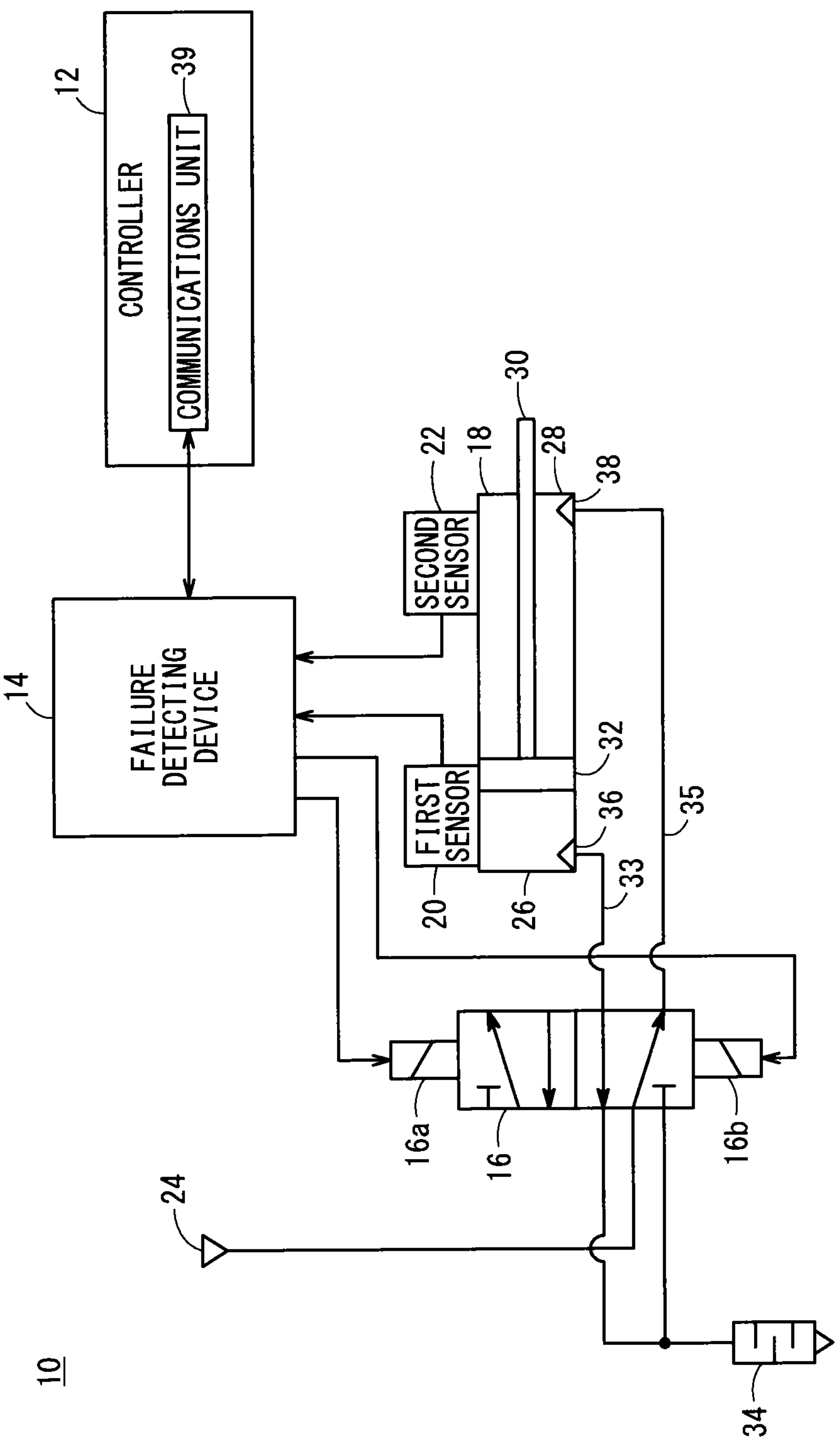
FIG. 2 is a schematic diagram showing a partial modification of the fault detection system of FIG. 1.

FIG. 1 shows a situation in which the controller 12 includes the output unit 12*a*, the input unit 12*b*, and the detection result input unit 12*c*, in such a manner that between the controller 12 and the failure detecting device 14, various signals are transmitted and received by way of parallel communications. However, the fault detection system 10 is not limited to the configuration shown in FIG. 1. As shown in FIG. 2, a communications unit 39 may be provided in the controller 12, and serial connections may be made through a field bus or the like between the communications unit 39 and the failure detecting device 14, whereby the various signals may be transmitted and received by way of serial communications.

[Configuration of Failure Detecting Device]

Figure 3:
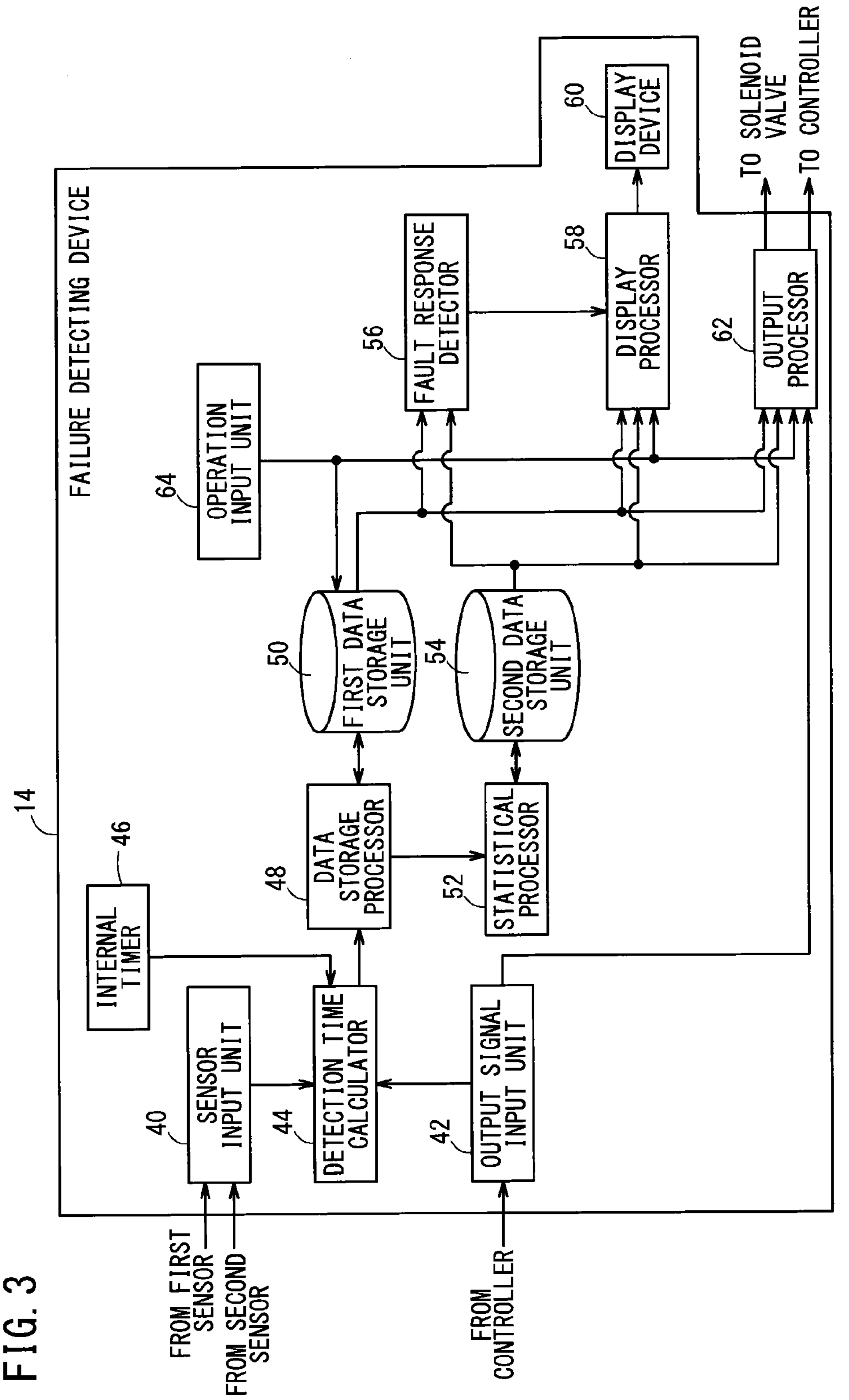
FIG. 3 is a block diagram of the failure detecting device shown in FIGS. 1 and 2.

As shown in FIG. 3, the failure detecting device 14 includes a sensor input unit 40, an output signal input unit 42, a detection time calculator 44 (stroke time calculator), an internal timer 46, a data storage processor 48, a first data storage unit 50 (first storage unit), a statistical processor 52 (statistical computation processing unit), a second data storage unit 54 (second storage unit), a fault response detector 56 (fault detector), a display processor 58, a display device 60, an output processor 62, and an operation input unit 64.

The detection signals from the first sensor 20 and the second sensor 22 (see FIGS. 1 and 2) are input to the sensor input unit 40. When the detection signal from either the first sensor 20 or the second sensor 22 is input thereto (i.e., when the signal level of the detection signal switches from a low level to a high level), the sensor input unit 40 detects the rising edge of the detection signal, and outputs a detection result thereof to the detection time calculator 44. Further, when the input of the detection signal from either the first sensor 20 or the second sensor 22 is stopped (i.e., when the signal level of the detection signal switches from a high level to a low level), the sensor input unit 40 detects the falling edge of the detection signal, and outputs a detection result thereof to the detection time calculator 44.

The control signal, which is output from the output unit 12*a* of the controller 12, is input to the output signal input unit 42. The output signal input unit 42 outputs the control signal that has been input thereto to the detection time calculator 44 and the output processor 62. The output processor 62 outputs the control signal that has been input thereto to the solenoid 16*a* or the solenoid 16*b*.

The detection time calculator 44, using a timer function of the internal timer 46, calculates a first time T1 (first detection time) from a time at which the control signal is input until a time at which a detection result of the falling edge is input. Further, the detection time calculator 44 calculates a second time T2 (second detection time) from a time at which the control signal is input until a time at which a detection result of the rising edge is input. In addition, the detection time calculator 44 calculates, as the stroke time T3 of the piston 32 between the one end 26 and the other end 28, a time difference (T2−T1) between the first time T1 and the second time T2. The first time T1, the second time T2, and the stroke time T3 are defined in the manner described below, responsive to the displacement direction of the piston 32 between the one end 26 and the other end 28.

In the case that the piston 32, at a position on the side of the one end 26, is displaced toward the other end 28 as a result of the control signal being supplied to the solenoid 16*a* from the output processor 62, the first sensor 20 eventually becomes incapable of detecting the piston 32 after elapse of a predetermined time from supply of the control signal to the solenoid 16*a*, whereupon the detection signal ceases to be output. Consequently, the sensor input unit 40 is capable of detecting the falling edge of the detection signal from the first sensor 20.

Accordingly, assuming that the time delay required to supply the control signal between the controller 12 and the solenoid 16*a* is small, the first time T1 when the piston 32 is displaced from the one end 26 toward the other end 28 can be regarded as a time period from the time at which the control signal starts to be supplied from the controller 12 until the time at which the first sensor 20 can no longer detect the piston 32.

Further, upon the piston 32 and the second sensor 22 being brought into confronting relation to each other by movement of the piston 32 to the other end 28, the second sensor 22 detects the piston 32, and output of the detection signal is started. Consequently, the sensor input unit 40 is capable of detecting the rising edge of the detection signal from the second sensor 22. Accordingly, the second time T2 when the piston 32 is displaced from the one end 26 toward the other end 28 can be regarded as a time period from the time at which the control signal starts to be supplied from the controller 12 until the time at which the second sensor 22 starts to detect the piston 32.

For this reason, the stroke time T3 of the piston 32, when the piston 32 is displaced from the one end 26 toward the other end 28, becomes the time period between the time of the falling edge of the detection signal from the first sensor 20 to the time of the rising edge of the detection signal from the second sensor 22.

On the other hand, in the case that the piston 32, which is now located on the side of the other end 28, is displaced toward the one end 26 as a result of the control signal being supplied to the solenoid 16*b* from the output processor 62, the second sensor 22 eventually becomes incapable of detecting the piston 32 after elapse of a predetermined time from supply of the control signal to the solenoid 16*b*, whereupon the detection signal ceases to be output. Consequently, the sensor input unit 40 is capable of detecting the falling edge of the detection signal from the second sensor 22.

Accordingly, assuming that the time delay required to supply the control signal between the controller 12 and the solenoid 16*b* is small, the first time T1 when the piston 32 is displaced from the other end 28 toward the one end 26 can be regarded as a time period from the time at which the control signal starts to be supplied from the controller 12 until the time at which the second sensor 22 can no longer detect the piston 32.

Further, upon the piston 32 and the first sensor 20 being brought into confronting relation to each other by movement of the piston 32 to the one end 26, the first sensor 20 detects the piston 32, and output of the detection signal is started. Consequently, the sensor input unit 40 is capable of detecting the rising edge of the detection signal from the first sensor 20. Accordingly, the second time T2 when the piston 32 is displaced from the other end 28 toward the one end 26 can be regarded as a time period from the time at which the control signal starts to be supplied from the controller 12 until the time at which the first sensor 20 starts to detect the piston 32.

For this reason, the stroke time T3 of the piston 32, when the piston 32 is displaced from the other end 28 toward the one end 26, becomes the time period between the time of the falling edge of the detection signal from the second sensor 22 to the time of the rising edge of the detection signal from the first sensor 20.

The first time T1, the second time T2, and the stroke time T3, which are calculated in the foregoing manner, are output to the data storage processor 48 from the detection time calculator 44. The data storage processor 48 stores (accumulates) data concerning the first time T1, the second time T2, and the stroke time T3 in the first data storage unit 50.

As described above, the fault detection system 10 is incorporated in an assembly of equipment (not shown). In this case, by supplying control signals alternately to the solenoids 16*a*, 16*b* from the controller 12 and through the failure detecting device 14, the directional switching valve 16 is operated to supply pressure fluid selectively to the one end 26 and the other end 28 of the actuator 18. Accordingly, the piston 32 is moved reciprocally in the left and right directions of FIGS. 1 and 2 in the interior of the actuator 18.

Therefore, under actual usage, the first sensor 20 and the second sensor 22 detect the piston 32 respectively, and detection signals indicative of detection results therefrom are output to the sensor input unit 40. The sensor input unit 40 detects the falling edge and the rising edge of each of the detection signals, and outputs detection results to the detection time calculator 44. Accordingly, each time that control signals are supplied alternately to the solenoids 16*a*, 16*b*, the detection time calculator 44 calculates the first time T1, the second time T2, and the stroke time T3, and the data storage processor 48 sequentially stores the first time T1, the second time T2, and the stroke time T3, which have been calculated, in the first data storage unit 50.

The statistical processor 52 reads out through the data storage processor 48 all of the data concerning the first time T1 and the stroke time T3 that are stored in the first data storage unit 50, and carries out a predetermined statistical computation process with respect to the data of the first time T1 and the stroke time T3, which have been read out. The result of the statistical computation process is stored as a statistically calculated value in the second data storage unit 54. The fault response detector 56 reads out at least the statistically calculated value that is stored in the second data storage unit 54, and if the read out statistically calculated value exceeds a predetermined threshold, it is judged that a fault of the actuator 18 or the like has occurred. The judgment result of the fault response detector 56 is output to the display processor 58 and the output processor 62. The display processor 58 performs a predetermined display-related process with respect to the judgment result, and displays the judgment result on the display device 60. On the other hand, the output processor 62 outputs the judgment result that was input thereto as a detection signal to the controller 12.

Next, descriptions shall be given of two detailed examples first detailed example, second detailed example in relation to the statistical computation process carried out in the statistical processor 52, and the judgment process carried out in the fault response detector 56.

First Detailed Example

In the first detailed example, the statistical computation process, which is performed by the statistical processor 52, is carried out using predetermined values and the first time T1 or the stroke time T3, and the judgment process by the fault response detector 56 is carried out using the statistically calculated value that has been obtained by the statistical computation process.

In the first detailed example, the predetermined values are defined by a normal stroke time T3n and a normal first time T1n (normal value) for the piston 32. In this case, the normal stroke time T3 n is defined as the stroke time T3 of the piston 32 between the one end 26 and the other end 28, in a state in which an abnormality such as deterioration or failure of the actuator 18 is not occurring (e.g., an initial operating state of the actuator 18 immediately after installation or replacement thereof). Further, the normal first time T1n is defined as the first time T1 in a condition in which an abnormality such as deterioration or failure of the actuator 18 is not occurring.

Figure 4:
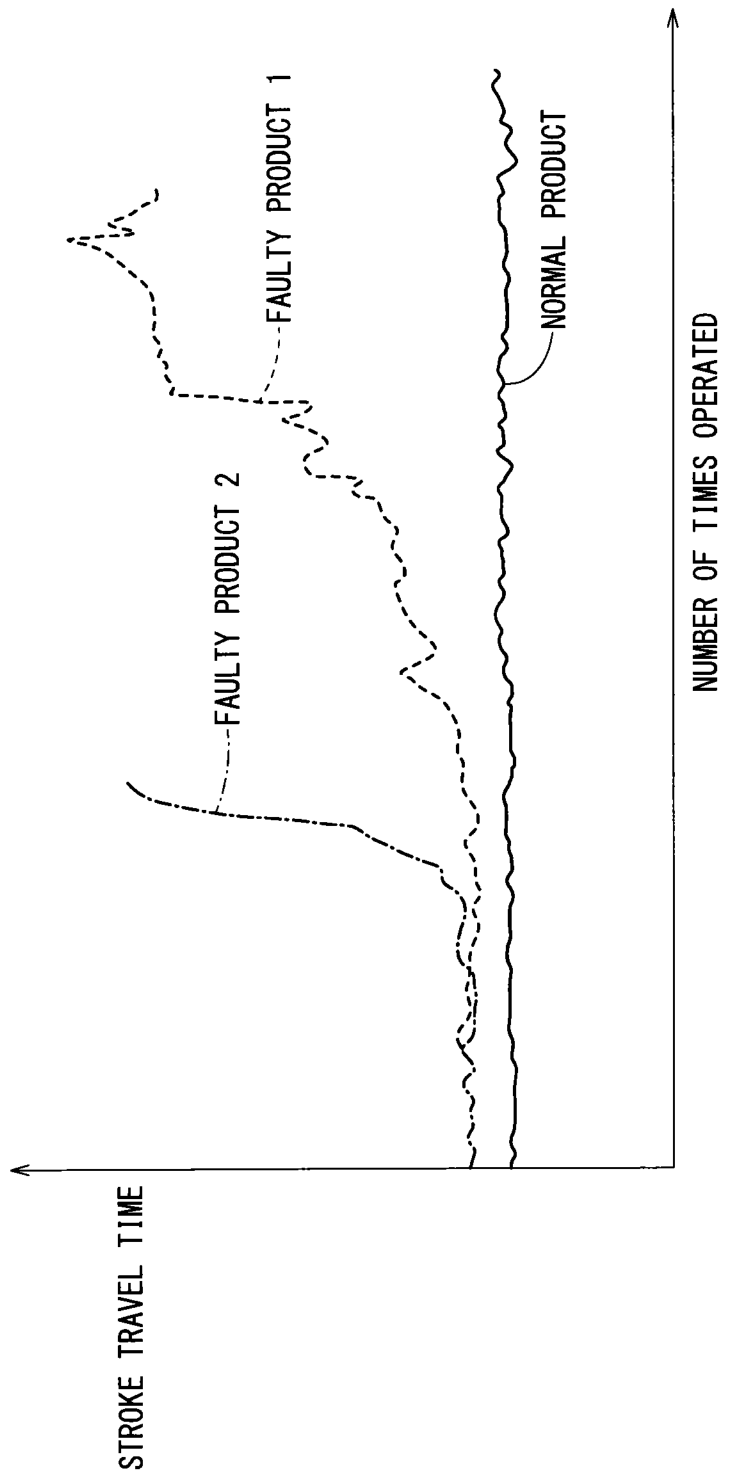
FIG. 4 is a graph showing a difference between a normal component and a component in which a fault is occurring, in relation to the actuator shown in FIGS. 1 and 2.

More specifically, as shown in FIG. 4, in the case of a normal actuator 18 (indicated by the term "normal product" shown by the solid line) in which an abnormality such as deterioration or failure is not occurring, irrespective of the number of times that the piston 32 is operated, the stroke time T3 (indicated by the term "stroke time" in FIG. 4) is substantially constant. On the other hand, in the case of an actuator 18 in which a fault is occurring (indicated by the term "faulty product 1" shown by the dashed line, and the term "faulty product 2" shown by the one-dot-chain line), if the number of times that the piston 32 is operated goes beyond a predetermined number, the stroke time T3 becomes longer in comparison with that of the normal product.

In other words, in the case of the faulty product 1 and the faulty product 2, in comparison with the normal product, the variability of the stroke time T3 becomes greater when the number of times that the piston 32 is operated increases. Consequently, the deviation between the stroke time T3 of the normal product and the stroke times T3 of the faulty product 1 and the faulty product 2 becomes greater as the number of operations increases. Further, concerning the average value, the standard deviation, and the variance of the stroke times T3 of the faulty product 1 and the faulty product 2, as the number of operations increases, it is to be expected that the variability with respect to the average value, the standard deviation, and the variance of the stroke time T3 of the normal product will also become greater.

Thus, in the present embodiment, in the case that the normal stroke time T3 n and the normal first time T1n are known beforehand, the normal stroke time T3 n and the normal first time T1n can be preset beforehand by the operator through use of the operation input unit 64, which is constituted by a numeric keypad or the like. The normal stroke time T3 n and the normal first time T1n, which are set in the foregoing manner, are stored as normal values in the first data storage unit 50. Further, the normal stroke time T3 n and the normal first time T1n are displayed on the display device 60 through the display processor 58, and also are output to the controller 12 through the output processor 62.

In the first detailed example, in accordance with the reciprocal movement of the piston 32 in the left and right directions of FIGS. 1 and 2, the first time T1 and the stroke time T3 are calculated sequentially by the detection time calculator 44. Each time that the first time T1 and the stroke time T3, which are calculated as described above, are stored in the first data storage unit 50, the statistical processor 52 reads out from the first data storage unit 50 the currently stored first time T1 and the stroke time T3, and the normal first time T1n and the normal stroke time T3 n that have been stored beforehand.

Next, the statistical processor 52 calculates an absolute value $\epsilon T1$ ($=|T1-T1n|$) of the deviation between the first time T1 and the normal first time T1n, and an absolute value $\epsilon T3$ ($=|T3-T3n|$) of the deviation between the stroke time T3 and the normal stroke time T3n. The calculated absolute values $\epsilon T1$, $\epsilon T3$ are stored respectively as statistically calculated values in the second data storage unit 54.

Next, the fault response detector 56 reads out each of the absolute values $\epsilon T1$, $\epsilon T3$ that are stored in the second data storage unit 54, and compares the read out absolute values $\epsilon T1$, $\epsilon T3$ respectively with threshold values TH1, TH3.

In this case, if the absolute value $\epsilon T3$ lies within the threshold value TH3 ($\epsilon T3 \leq TH3$), since the stroke time T3 is indicative of normal response information, the fault response detector 56 judges that the actuator 18 is functioning normally. On the other hand, if the absolute value $\epsilon T3$ exceeds the threshold value TH3 ($\epsilon T3 > TH3$), since the stroke time T3 is indicative of abnormal response information, the fault response detector 56 judges that the actuator 18 is suffering from a fault.

Further, if the absolute value $\epsilon T1$ lies within the threshold value TH1 ($\epsilon T1 < TH1$), since the first time T1 is indicative of normal response information, the fault response detector 56 judges that the tubes 33, 35 between the directional switching valve 16 and the actuator 18 are behaving normally. On the other hand, if the absolute value $\epsilon T1$ exceeds the threshold value TH1 ($\epsilon T1 > TH1$), since the first time T1 is judged to be indicative of abnormal response information, the fault response detector 56 judges that a fault has occurred in the tubes 33, 35 between the directional switching valve 16 and the actuator 18.

Since the above judgment results from the fault response detector 56 are displayed on the display device 60 through the display processor 58, the occurrence or non-occurrence of a fault of the actuator 18, or the occurrence or non-occurrence of a fault in the tubes 33, 35 between the directional switching valve 16 and the actuator 18 can be grasped. As noted above, the first times T1, T1n, the second time T2, and the stroke times T3, T3 n are stored in the first data storage unit 50, and the absolute values $\epsilon T1$, $\epsilon T3$ are stored in the second data storage unit 54. Therefore, together with the judgment results from the fault response detector 56, the first times T1, T1n, the second time T2, the stroke times T3, T3n, the absolute values ϵT1, ϵT3, and the threshold values TH1, TH3 may also be displayed in the display device 60.

Further, the above judgment results from the fault response detector 56 are output as detection signals to the controller 12 through the output processor 62. Therefore, if there is a judgment result indicative of a fault of the actuator 18, or indicative of a fault of the tubes 33, 35 between the directional switching valve 16 and the actuator 18, the controller 12 stops the supply of control signals to the solenoids 16*a*, 16*b*. In this case, along with the detection signal, the output processor 62 may output to the controller 12 various information pertaining to the first times T1, T1n, the second time T2, the stroke times T3, T3n, the absolute values ϵT1, ϵT3, and the threshold values TH1, TH3.

Second Detailed Example

As shown in FIG. 4, as the number of times that the piston 32 is operated increases, in comparison with the normal product, the variability of the stroke time T3 of the faulty product 1 and the faulty product 2 becomes greater. Accordingly, concerning the average value, the standard deviation, and the variance of the stroke times T3 of the faulty product 1 and the faulty product 2, as the number of operations increases, it is to be expected that the variability with respect to the average value, the standard deviation, and the variance of the stroke time T3 of the normal product will also become greater.

Thus, in the second detailed example, a statistical computation process is carried out by the statistical processor 52 with respect to the first time T1 and the stroke time T3. The fault response detector 56 compares statistically calculated values, which are obtained by the statistical computation process, with normal values that have been obtained beforehand by the statistical computation process, whereby a judgment is made concerning the occurrence or non-occurrence of a fault of the actuator 18.

More specifically, in the second detailed example, the statistically calculated values, which are obtained by the statistical computation process with respect to the first time T1 and the stroke time T3, are defined by an average value AVE1, a standard deviation σ1, or a variance $σ1^2$ of the first time T1, and an average value AVE3, a standard deviation σ3, or a variance $σ3^2$ of the stroke time T3.

Further, the normal values, which are obtained beforehand by the statistical computation process, are defined by average values AVE1n, AVE3n, standard deviations σ1n, σ3n, or variances $σ1n^2$, $σ3n^2$, which are calculated by the statistical computation process with respect to first times T1 and stroke times T3 that are obtained inside of a given calibration time, wherein the calibration time is taken as a fixed period from an initial operation state in relation to a normal actuator 18. Thus, the normal values in the second detailed example are defined by an average value, a standard deviation, or a variance corresponding to the first time T1 and the stroke time T3 of the normal product of FIG. 4. Such normal values are stored in the second data storage unit 54.

In addition, in the second detailed example, in accordance with reciprocal movement of the piston 32 in the left and right directions of FIGS. 1 and 2, the first time T1 and the stroke time T3 are calculated sequentially by the detection time calculator 44. Each time that the first time T1 and the stroke time T3, which are calculated as described above, are stored in the first data storage unit 50, the statistical processor 52 reads out data of all of the first times T1 and the stroke times T3 that are stored in the first data storage unit 50.

Next, using the read out data of all of the first times T1, the statistical processor 52 calculates the average value AVE1, the standard deviation σ1, or the variance $σ1^2$, and using the data of all of the stroke times T3, the statistical processor 52 calculates the average value AVE3, the standard deviation σ3, or the variance $σ3^2$. The calculated average values AVE1, AVE3, the standard deviations σ1, σ3, or the variances $σ1^2$, $σ3^2$ are temporarily stored, respectively, as statistically calculated values in the second data storage unit 54.

Next, the statistical processor 52 reads out from the second data storage unit 54 the average values AVE1n, AVE3n, the standard deviations σ1n, σ3n, or the variances $σ1n^2$, $σ3n^2$.

Next, the statistical processor 52 calculates absolute values ϵAVE1 (=|AVE1−AVE1n|), ϵAVE3 (=|AVE3−AVE3n|) of the deviations between the average values AVE1, AVE3 and the average values AVE1n, AVE3n, or calculates absolute values ϵσ1 (=|σ1−σ1n|), ϵσ3 (=|(σ3−σ3n|) of the deviations between the standard deviations σ1, σ3 and the standard deviations σ1n, σ3n, or calculates absolute values $ϵσ1^2$ ($=|σ1^2−σ1n^2|$), $ϵσ3^2$ ($=|σ3^2−σ3n^2|$) of the deviations between the variances $σ1^2$, $σ3^2$ and the variances $σ1n^2$, $σ3n^2$.

The calculated absolute values ϵAVE1, ϵAVE3, the absolute values ϵσ1, ϵσ3, or the absolute values $ϵσ1^2$, $ϵσ3^2$ are stored, respectively, as statistically calculated values in the second data storage unit 54.

The fault response detector 56 compares the respective absolute values ϵAVE1, ϵAVE3, the respective absolute values ϵσ1, ϵσ3, or the respective absolute values $ϵσ1^2$, $ϵσ3^2$ that are stored in the second data storage unit 54 with the predetermined threshold values THAVE1, THAVE3, the threshold values THσ1, THσ3, or the threshold values $THσ1^2$, $THσ3^2$.

In this case, if the absolute value ϵAVE3, ϵσ3, or $ϵσ3^2$ lies within the threshold value THAVE3, THσ3, or $THσ3^2$ (ϵAVE3≤THAVE3, ϵσ3≤THσ3, or $ϵσ3^2≤THσ3^2$), since the stroke time T3 is indicative of normal response information, the fault response detector 56 judges that the actuator 18 is functioning normally. On the other hand, if the absolute value ϵAVE3, ϵσ3, or $ϵσ3^2$ exceeds the threshold value THAVE3, THσ3, or $THσ3^2$ (ϵAVE3>THAVE3, ϵσ3>THσ3, or $ϵσ3^2>THσ3^2$), since the stroke time T3 is indicative of abnormal response information, the fault response detector 56 judges that the actuator 18 is suffering from a fault.

Further, if the absolute value ϵAVE1, ϵσ1, or $ϵσ1^2$ lies within the threshold value THAVE1, THσ1, or $THσ1^2$ (ϵAVE1≤THAVE1, ϵσ1≤THσ1, or $ϵσ1^2≤THσ1^2$), since the first time T1 is indicative of normal response information, the fault response detector 56 judges that the tube 33 and the tube 35 between the directional switching valve 16 and the actuator 18 are functioning normally. On the other hand, if the absolute value ϵAVE1, ϵσ1, or $ϵσ1^2$ exceeds the threshold value THAVE1, THσ1, or $THσ1^2$ (ϵAVE1>THAVE1, ϵσ1>THσ1, or $ϵσ1^2>THσ1^2$), since the first time T1 is indicative of abnormal response information, the fault response detector 56 judges that the tube 33 and the tube 35 between the directional switching valve 16 and the actuator 18 are suffering from a fault.

Further, in the second detailed example as well, since the above judgment results from the fault response detector 56 are displayed on the display device 60 through the display processor 58, the operator can grasp the occurrence or non-occurrence of a fault of the actuator 18, or the occurrence or non-occurrence of a fault in the tubes 33, 35 between the directional switching valve 16 and the actuator 18. Further, also in the second detailed example, together with the judgment results from the fault response detector 56, the display device 60 may also display the first time T1, the second time T2, and the stroke time T3, and the aforementioned statistically calculated values and threshold values.

Furthermore, since the aforementioned judgment result from the fault response detector 56 is output as a detection signal to the controller 12 through the output processor 62, in the event of a judgment result, which is indicative of a fault of the actuator 18, or a fault of the tubes 33, 35 between the directional switching valve 16 and the actuator 18, the controller 12 can stop the supply of control signals to the solenoids 16*a*, 16*b*. In this case, along with the detection signal, the output processor 62 may output to the controller 12 various information pertaining to the first time T1, the second time T2, the stroke time T3, and the aforementioned statistically calculated values and threshold values.

Further, in the second detailed example, the statistical processor 52 may calculate only the respective average values AVE1, AVE3, the respective standard deviations σ1, σ3 or the respective variances $σ1^2$, $σ3^2$, and store such calculations as statistically calculated values in the second data storage unit 54. In this case, the fault response detector 56 may read out from the second data storage unit 54 the respective average values AVE1, AVE3, the respective standard deviations σ1, σ3, or the respective variances $σ1^2$, $σ3^2$, and the normal average values AVE1n, AVE3n, the standard deviations σ1n, σ3n, or the variances $σ1n^2$, $σ3n^2$, and may calculate the absolute value of the deviation between the read out statistically calculated values and the normal values. Accordingly, by comparing the absolute value of the calculated deviation with predetermined thresholds, a fault of the actuator 18, or a fault of the tubes 33, 35 between the directional switching valve 16 and the actuator 18 can be detected.

Further, in the second detailed example, the average values AVE1n, AVE3n, the standard deviations σ1n, σ3n, or the variances $σ1n^2$, $σ3n^2$, which are stored as normal values in the second data storage unit 54, can easily be acquired by assuming, as a calibration time, a fixed period from a state of initial operation of a normal actuator 18, and then applying the calculation method for the aforementioned average values AVE1, AVE3, the standard deviations σ1, σ3, or the variances $σ1^2$, $σ3^2$ within the calibration time period.

However, if the normal values are acquired, after data of all of the first times T1 and the stroke times T3 within the calibration time period have been stored in the first data storage unit 50, the statistical processor 52 may read out data of all of the first times T1 and the stroke times T3 that are stored in the first data storage unit 50, and then may calculate the average values AVE1n, AVE3n, the standard deviations σ1n, σ3n, or the variances $σ1n^2$, $σ3n^2$ of the read out data, and store such calculated values in the second data storage unit 54.

Further, although in the above-described first detailed example, an operator sets the normal values by manipulating the operation input unit 64, similar to the case of the second detailed example, the average values AVE1, AVE3 may be acquired during the calibration time period, and such average values AVE1, AVE3 may be set as normal values in the first data storage unit 50.

[Operations of the Fault Detection System]

The fault detection system 10 according to the present embodiment is configured as described above. Next, operations of the fault detection system 10 will be described with reference to FIG. 5. In providing such operational descriptions, reference will also be made to FIGS. 1 through 4 as necessary.

Figure 5:
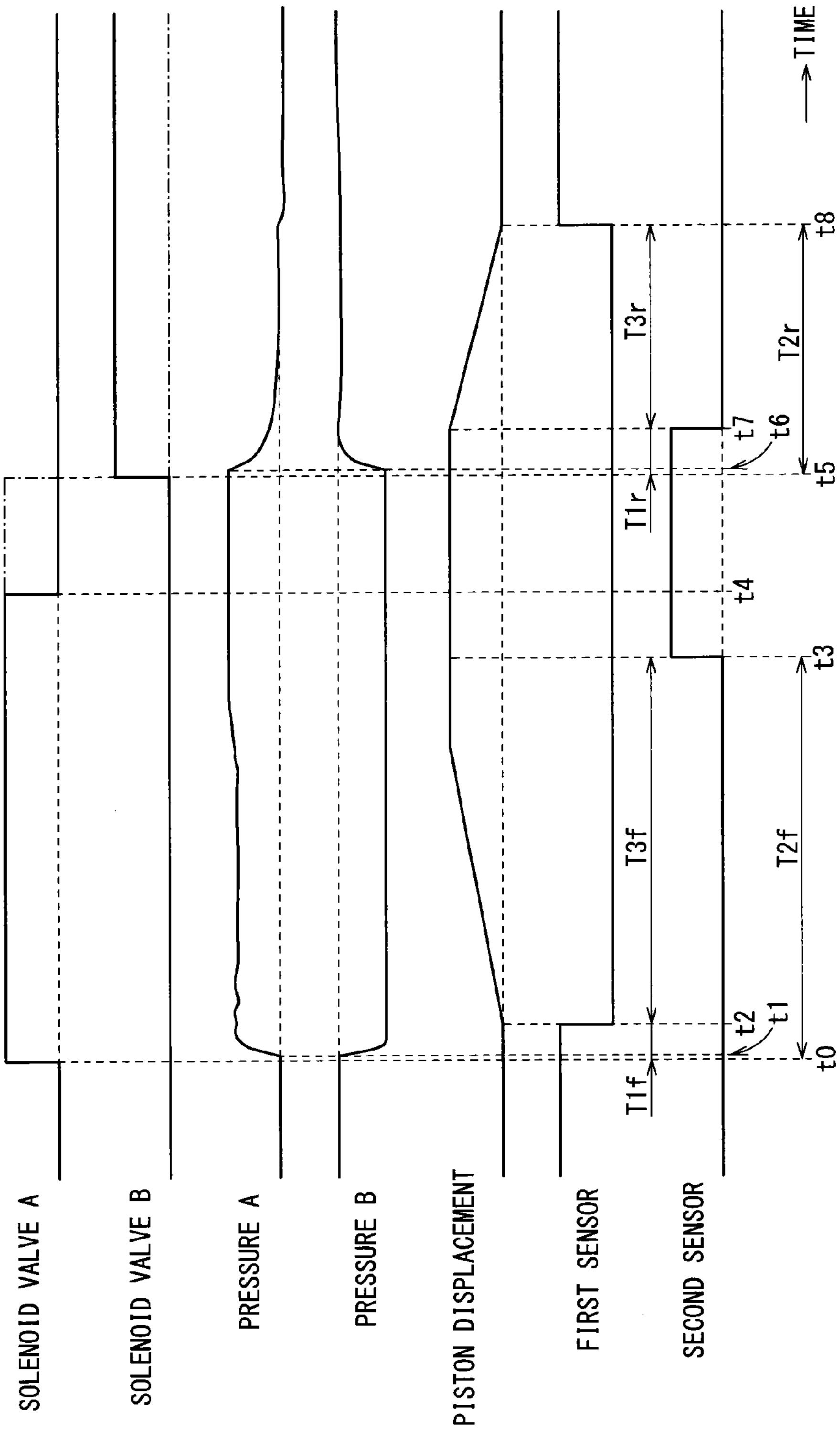
FIG. 5 is a timing chart showing operations of the fault detection system of FIGS. 1 and 2.

FIG. 5 is a timing chart showing operations during one round trip of the piston 32, in which the piston 32, which is positioned at the one end 26, is displaced to the other end 28, and thereafter, the piston 32 is displaced back to the one end 26.

In this case, the labels "Solenoid Valve A" and "Solenoid Valve B" indicate operations (excitation, non-excitation) of the solenoids 16*a*, 16*b*, and more specifically, show waveforms of the control signals supplied to the solenoids 16*a*, 16*b*. Further, the labels "Pressure A" and "Pressure B" indicate, respectively, internal pressures in the actuator 18 at the one end 26 and the other end 28. Furthermore, the time periods T1f, T2f, T3f indicate, respectively, the first time T1, the second time T2, and the stroke time T3 when the piston 32 is displaced from the one end 26 toward the other end 28. Still further, the time periods T1r, T2r, T3r indicate, respectively, the first time T1, the second time T2, and the stroke time T3 when the piston 32 is displaced from the other end 28 toward the one end 26.

At time t0, when a control signal is sent from the controller 12 to the solenoid 16*a* through the failure detecting device 14 (i.e., when the signal level of the control signal changes from a low level to a high level), the directional switching valve 16 is switched to a condition in which the upper side block thereof shown in FIGS. 1 and 2 is selected. Consequently, pressure fluid is supplied from the fluid pressure source 24 to the one end 26 of the actuator 18 through the directional switching valve 16, the tube 33, and the port 36, together with pressure fluid being discharged to the exterior from the other end 28 through the port 38, the tube 35, the directional switching valve 16, and the silencer 34. As a result, the pressure inside the one end 26 rises abruptly from time t1 and thereafter increases gradually. On the other hand, the pressure inside the other end 28 decreases rapidly from time t1 and thereafter becomes substantially constant.

Further, by supplying the pressure fluid from the directional switching valve 16 to the one end 26, from time t2, the piston 32, which is positioned at the one end 26, is displaced toward the other end 28. As a result, at time t2, the first sensor 20 becomes incapable of detecting the piston 32, and output of the detection signal to the sensor input unit 40 of the failure detecting device 14 is stopped (the level of the detection signal changes from a high level to a low level).

Accordingly, the sensor input unit 40 detects the falling edge of the detection signal from the first sensor 20, and outputs the detection result to the detection time calculator 44. Using the timer function of the interior timer 46, the detection time calculator 44 calculates, as the first time T1f, the time period from time t0 at which the control signal is supplied to the solenoid 16*a* to time t2 at which the falling edge is detected. The calculated first time T1f is stored in the first data storage unit 50 through the data storage processor 48.

Thereafter, when the piston 32 is displaced to the other end 28, the second sensor 22 detects the piston 32 at time t3, and a detection signal thereof is output to the sensor input unit 40 (the level of the detection signal changes from a low level to a high level). Accordingly, the sensor input unit 40 detects the rising edge of the detection signal from the second sensor 22, and outputs the detection result to the detection time calculator 44. Using the timer function of the interior timer 46, the detection time calculator 44 calculates, as the second time T2f, the time period from time t0 to time t3 at which the rising edge is detected, and together therewith, calculates, as the stroke time T3f (=T2f−T1f) of the piston 32, the difference in time between the first time T1f and the second time T2f. The second time T2f and the stroke time T3f, which have been calculated, are stored in the first data storage unit 50 through the data storage processor 48.

Consequently, the statistical processor 52 reads out the first time T1f and the stroke time T3f, etc., from the first data storage unit 50, and carries out the predetermined statistical computation process of the aforementioned first detailed example or the second detailed example with respect to the first time T1f and the stroke time T3f, etc., which have been read out. After the computation process is carried out, the statistically calculated values can be stored in the second data storage unit 54.

Further, the fault response detector 56 reads out the statistically calculated value from the second data storage unit 54, and compares the read out statistically calculated value with a predetermined threshold, whereby it can be judged whether or not a fault of the actuator 18, or a fault of the tube 33 between the directional switching valve 16 and the port 36 of the actuator 18 has occurred. More specifically, if the statistically calculated value concerning the stroke time T3f exceeds the threshold value, the fault response detector 56 judges that the actuator 18 is suffering from a fault such as deterioration or failure of the actuator 18. Further, if the statistically calculated value concerning the first time T1f exceeds the threshold value, the fault response detector 56 judges that a fault has occurred in the tube 33 between the directional switching valve 16 and the port 36. Further, the above judgment results from the fault response detector 56 are displayed on the display device 60, and are output as detection signals to the controller 12 from the output processor 62.

As shown in FIGS. 1 and 2, since the directional switching valve 16 is a double-acting solenoid valve, even if supply of the control signal to the solenoid **16*a* is stopped at time t4, the state of the directional switching valve 16** can be maintained.

Thereafter, at time t5, when a control signal is sent from the controller 12 to the solenoid **16*b* through the failure detecting device 14, the directional switching valve 16 is switched to the condition in which the lower side block thereof shown in FIG. 1 is selected. Consequently, pressure fluid is supplied from the fluid pressure source 24 to the other end 28 of the actuator 18 through the directional switching valve 16, the tube 35, and the port 38, together with pressure fluid being discharged to the exterior from the one end 26 through the port 36, the tube 33, the directional switching valve 16, and the silencer 34. As a result, the pressure inside the other end 28 rises abruptly from time t6 and thereafter settles at a constant value. On the other hand, the pressure inside the one end 26** falls abruptly from time t6 and thereafter decreases gradually.

Further, by supplying the pressure fluid from the directional switching valve 16 to the other end 28, from time t7, the piston 32, which is positioned at the other end 28, is displaced toward the one end 26. As a result, at time t7, the second sensor 22 becomes incapable of detecting the piston 32, and output of the detection signal with respect to the sensor input unit 40 of the failure detecting device 14 is stopped.

Accordingly, the sensor input unit 40 detects the falling edge of the detection signal from the second sensor 22, and outputs the detection result to the detection time calculator 44. Using the timer function of the interior timer 46, the detection time calculator 44 calculates, as the first time T1r, the time period from time t5 at which the control signal is supplied to the solenoid **16*b* to time t7 at which the falling edge is detected. The calculated first time T1r is stored in the first data storage unit 50 through the data storage processor 48**.

Thereafter, when the piston 32 is displaced to the one end 26, the first sensor 20 detects the piston 32 at time t8, and a detection signal thereof is output to the sensor input unit 40. Accordingly, the sensor input unit 40 detects the rising edge of the detection signal from the first sensor 20, and outputs the detection result to the detection time calculator 44. Using the timer function of the interior timer 46, the detection time calculator 44 calculates, as the second time T2r, the time period from time t5 to time t8 at which the rising edge is detected, and together therewith, calculates, as the stroke time T3r (=T2r−T1r) of the piston 32, the difference in time between the first time T1r and the second time T2r. The second time T2r and the stroke time T3r, which have been calculated, are stored in the first data storage unit 50 through the data storage processor 48.

Consequently, the statistical processor 52 reads out the first time T1r and the stroke time T3r, etc., from the first data storage unit 50, and carries out the predetermined statistical computation process of the first detailed example or the second detailed example with respect to the first time T1r and the stroke time T3r, etc., which have been read out. After the computation process is carried out, the statistically calculated values can be stored in the second data storage unit 54.

Further, the fault response detector 56 reads out the statistically calculated value from the second data storage unit 54, and compares the read out statistically calculated value with a predetermined threshold, whereby it can be judged whether or not a fault of the actuator 18, or a fault of the tube 35 between the directional switching valve 16 and the port 38 of the actuator 18 has occurred. More specifically, if the statistically calculated value concerning the stroke time T3r exceeds the threshold value, the fault response detector 56 judges that the actuator 18 is suffering from a fault such as deterioration or failure of the actuator 18. Further, if the statistically calculated value concerning the first time T1r exceeds the threshold value, the fault response detector 56 judges that a fault has occurred in the tube 35 between the directional switching valve 16 and the port 38. Further, the above judgment results from the fault response detector 56 are displayed on the display device 60, and are output as detection signals to the controller 12 from the output processor 62.

In this manner, in accordance with the piston 32 making one round trip between the one end 26 and the other end 28, a detection process for detecting a fault of the actuator 18, and a detection process for detecting a fault in the tubes 33, 35 between the directional switching valve 16 and the ports 36, 38 of the actuator 18 can be carried out. Consequently, with the fault detection system 10, even during operation of the equipment including the actuator 18, detection of the above-described faults can be performed.

Modifications of the Present Embodiment

Figure 6:
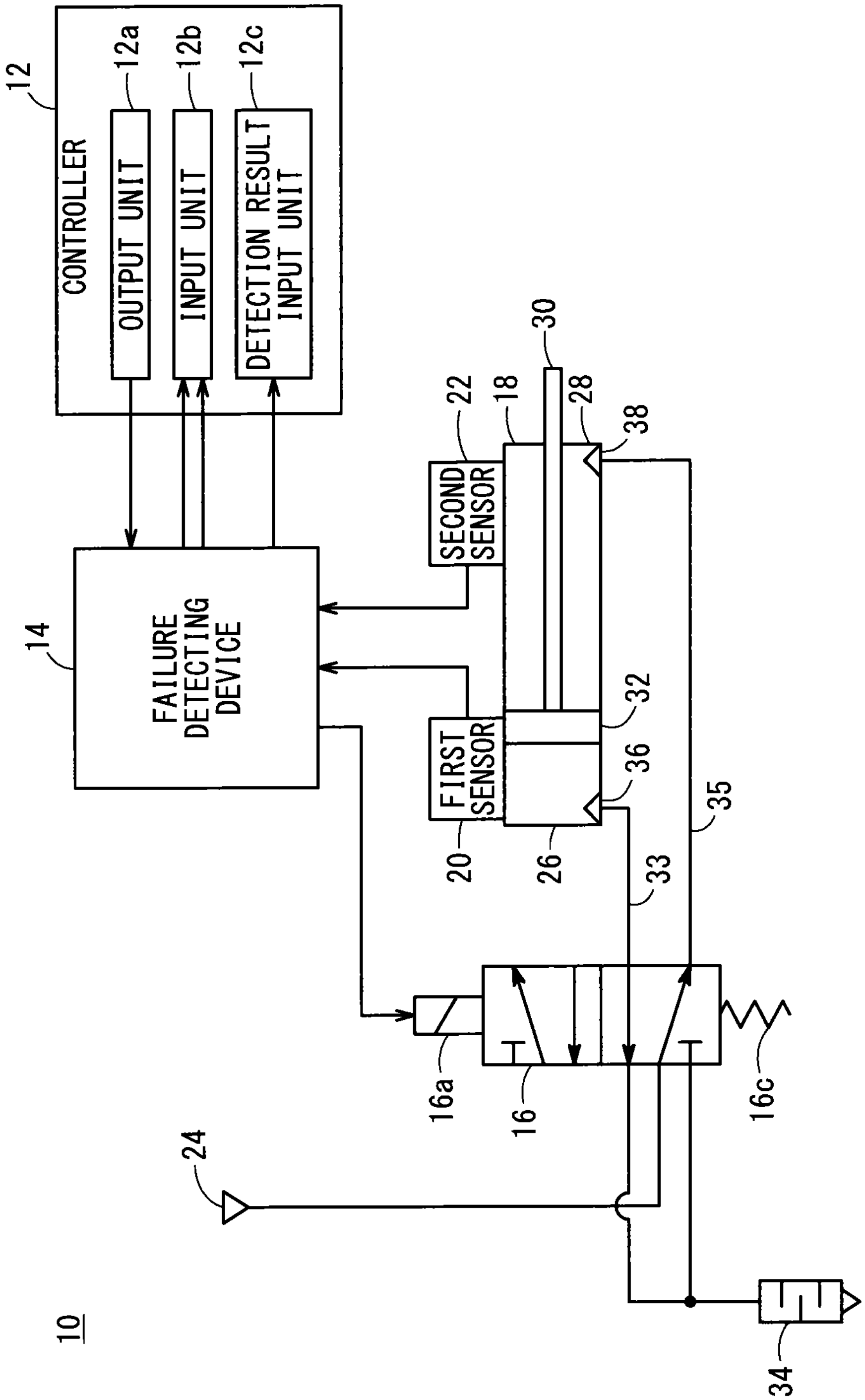
FIG. 6 is a schematic diagram showing a partial modification of the fault detection system of FIG. 1.
Figure 7:
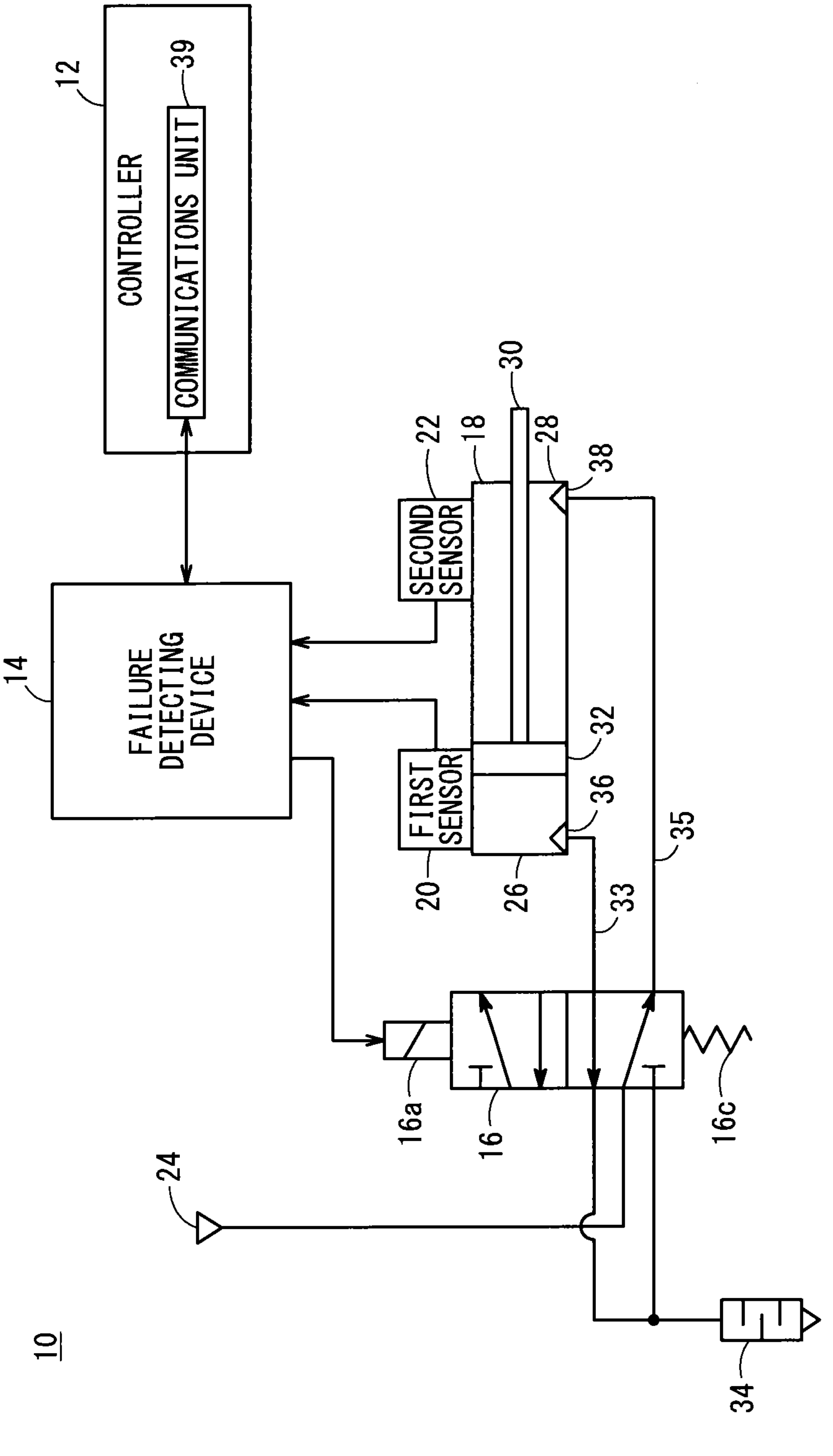
FIG. 7 is a schematic diagram showing a partial modification of the fault detection system of FIG. 2.

FIGS. 6 and 7 shows a configuration in which the double-acting directional switching valve 16 shown in FIGS. 1 and 2 is replaced by a single-acting directional switching valve 16. Accordingly, the solenoid **16*b* is replaced by a spring 16*c*. With the configuration of FIGS. 6 and 7, when a control signal is supplied to the solenoid 16*a*, the solenoid 16*a* is excited, and the directional switching valve 16 is placed in a state in which the upper side block is selected. On the other hand, if supply of the control signal to the solenoid 16***a* is stopped, the solenoid 16*a* becomes demagnetized, and under the action of the spring 16*c*, a state is brought about in which the lower side block is selected.

The operations of the configuration of FIGS. 6 and 7 differ from the operations of the configuration of FIGS. 1 and 2, in that, as shown by the one-dot chain lines in the timing chart of FIG. 5, supply of the control signal to the solenoid 16*a* is stopped at time t5, whereas, since the solenoid 16*b* is not provided, no control signal is supplied to the solenoid 16*b*. More specifically, apart from the feature that the solenoid 16*b* is replaced by the spring 16*c*, the configuration of FIGS. 6 and 7 is the same as the configuration of FIGS. 1 and 2, and thus operates substantially in the same manner as the configuration of FIGS. 1 and 2.

Figure 8:
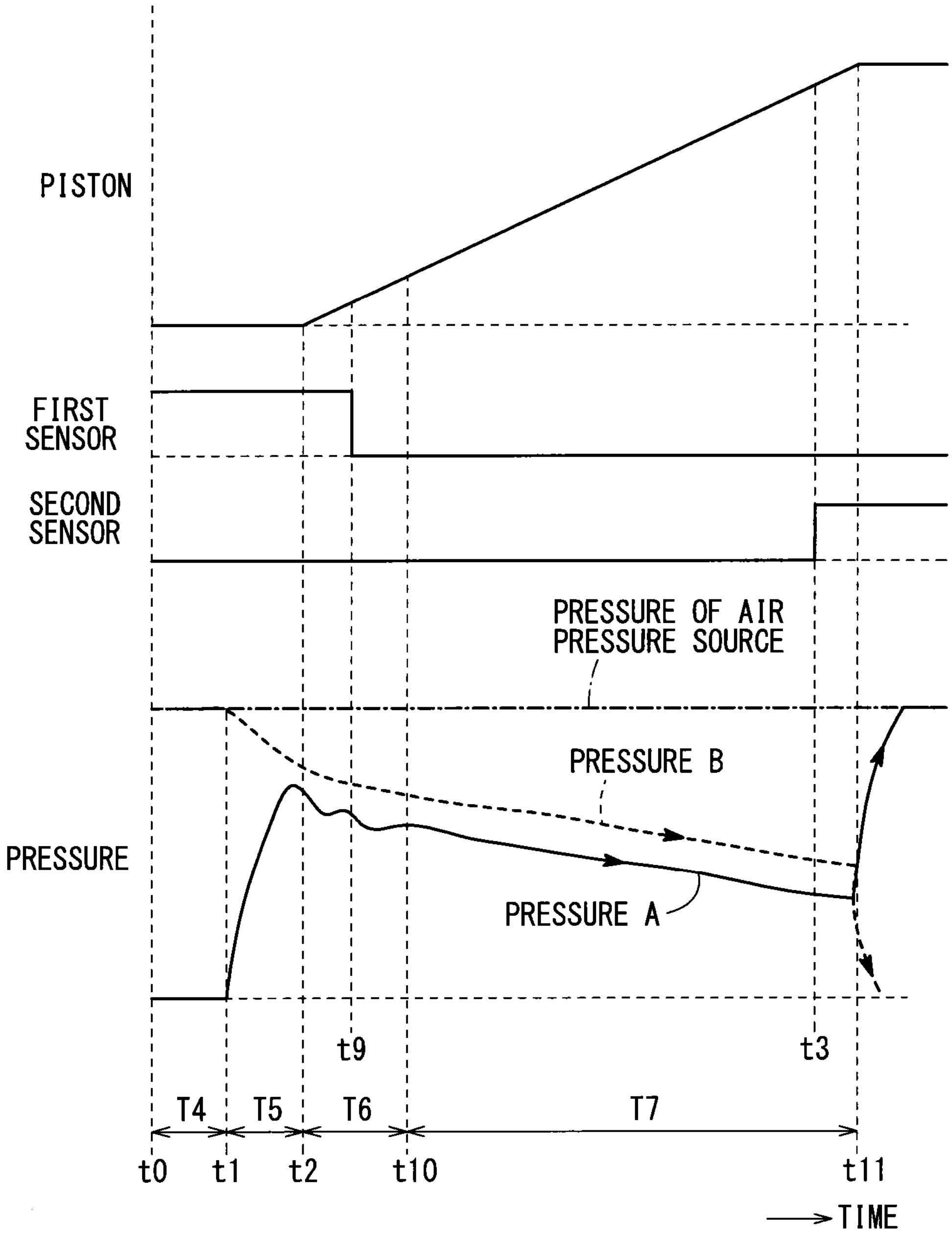
FIG. 8 is a timing chart showing a case in which the fault detection system of FIGS. 1, 2, 6 and 7 is applied to the system of Patent Document 2.
Figure 9:
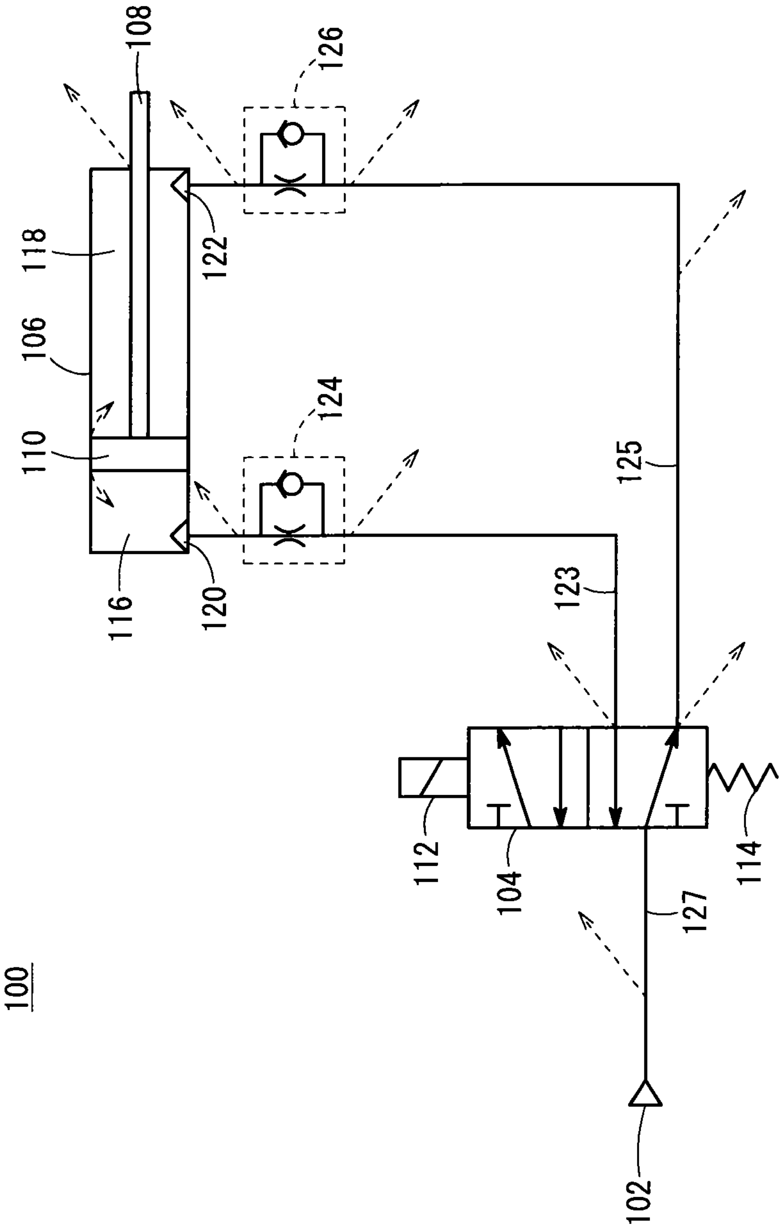
FIG. 9 PRIOR ART
FIG. 9 is a schematic diagram of a fault detection system for an actuator according to one conventional technique.
Figure 10:
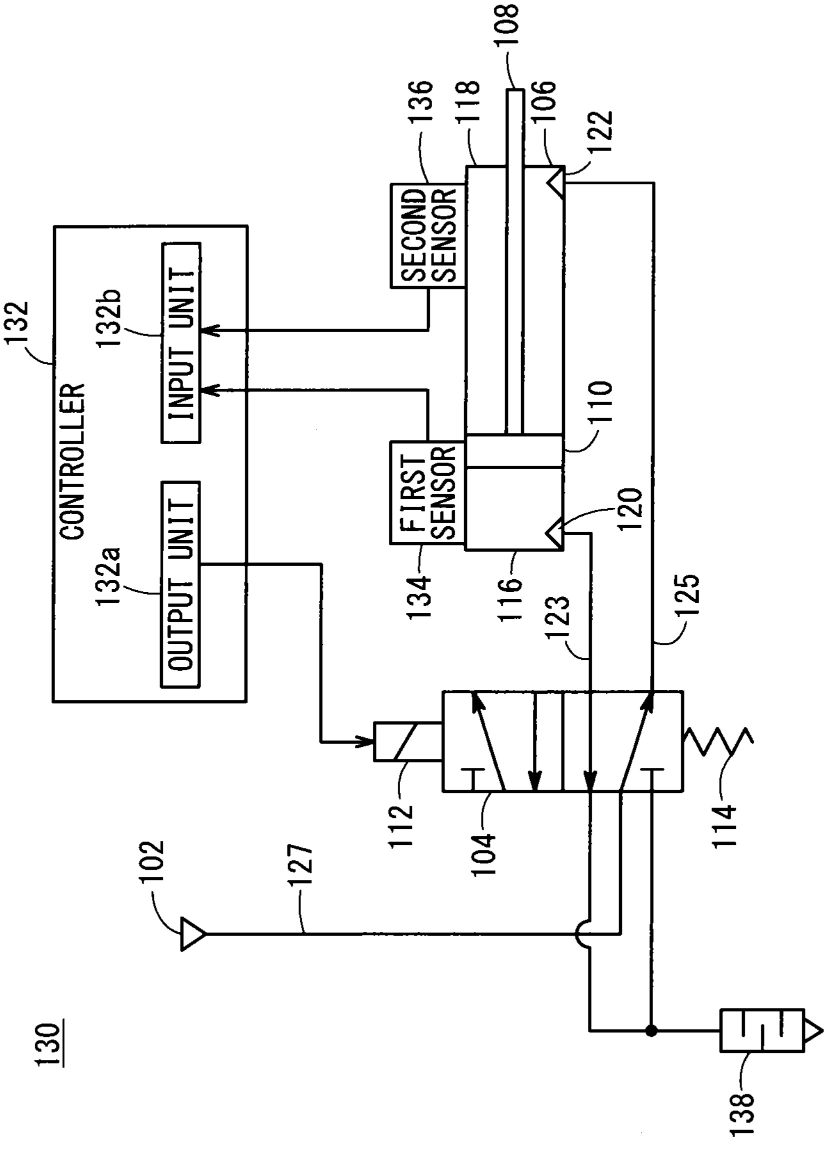
FIG. 10 PRIOR ART
FIG. 10 is a schematic diagram of a fault detection system for an actuator according to another conventional technique.

FIG. 8 is a timing chart showing a case in which the fault detection system 10 is applied to the system of Patent Document 2. The timing chart of FIG. 8 adds detection signals from the first sensor 20 and the second sensor 22 to the timing chart that is shown in FIG. 10 of Patent Document 2. Therefore, since explanations concerning time-based changes of pressure and displacement of the piston 32 are disclosed in Patent Document 2, which is expressly incorporated herein by reference, details of such features will be omitted from the present specification.

The time periods T4 to T7 correspond respectively to the features "Valve Actuation Delay", "Charge Region (Filling Region)", "Acceleration Region", and "Constant Velocity Region" disclosed in Patent Document 2. Further, time t9 corresponds to time t2 in FIG. 5, time t10 is a time at which a change takes place from the acceleration region to the constant velocity region, and time t11 is a time at which the piston 32 arrives and stops at the other end 28.

In this manner, by adding the failure detecting device 14 that makes up the fault detection system 10 to the conventional system, a fault of the actuator 18, or a fault of the tubes 33, 35 between the directional switching valve 16 and the actuator 18 can be detected easily and readily, and the fault detection system 10 can be constructed at low cost.

Advantages of the Present Embodiment

As has been described above, with the fault detection system 10 according to the present embodiment, a statistical computation process is carried out with respect to the stroke times T3, T3f, T3r of the piston 32, and based on the processing result, it is detected whether or not a fault of the actuator 18 has occurred. Therefore, even during operation of equipment including the actuator 18, a fault of the actuator 18 can be detected without requiring the equipment to be stopped. As a result, productivity of such equipment is maintained, and faults of the actuator 18 can be detected in real time while the equipment remains online.

Further, a maintenance cycle, which heretofore has been set (defined) based on the operator's judgment, can be managed automatically and numerically. More specifically, even if maintenance operations are not carried out regularly by the operator, the fault detection system 10 carries out maintenance automatically during operation of the equipment, and based on the stroke times T3, T3f, T3r, which serve as response information from the actuator 18, the occurrence of abnormalities of the actuator 18 are determined. In addition, with the fault detection system 10, based on the processing result of the statistical calculation carried out with respect to the stroke times T3, T3f, T3r, whether or not an abnormality of the actuator 18 has occurred can be judged (managed) numerically.

As a result, according to the present embodiment, the number of processing steps required for maintenance can be reduced, the burden imposed on the operator can be mitigated significantly, and maintainability of the equipment including the actuator 18 can be enhanced. Further, by being managed numerically, training and education of the operator in charge of such maintenance is facilitated.

Furthermore, since the stroke times T3, T3f, T3r are calculated based on the detection results of the first sensor 20 and the second sensor 22, existing sensors (limit switches, magnetic sensors) can be used without modification. More specifically, the fault detection system 10 can be constructed merely by adding the fault detecting device 14 with respect to conventional existing sensors. Accordingly, with the present invention, an abnormality or fault of the actuator 18 can be detected easily and at low cost.

Further, since the stroke times T3, T3f, T3r are stored (accumulated) in the first data storage unit 50, even in the case that the piston 32 moves reciprocally between the one end 26 and the other end 28, the statistical processor 52 can sequentially read out the stroke times T3, T3f, T3r from the first data storage unit 50, and carry out statistical calculations thereon. Further, since processing results are stored (accumulated) in the second data storage unit 54, the fault response detector 56 can suitably read out the processing results from the second data storage unit 54, and carry out detection processing thereon.

Further, in the first detailed example, based on a comparison between the normal value (the normal stroke time T3n), which is set beforehand, and the actually calculated stroke times T3, T3f, T3r, since it can be determined whether or not a fault of the actuator 18 has occurred, the occurrence of a fault of the actuator 18 can be judged accurately. More specifically, if the actuator 18 becomes deteriorated, each time that the stroke times T3, T3f, T3r are calculated based on the respective detection signals of the first sensor 20 and the second sensor 22, the variability in the absolute value $\epsilon$T3 of the deviation becomes greater. Thus, for example, if the absolute value $\epsilon$T3 of the deviation becomes greater than a predetermined threshold TH3, it can easily be judged that a fault of the actuator 18 has occurred.

The normal stroke time T3 n is defined as the stroke time T3 of the piston 32 between the one end 26 and the other end 28, in a state in which an abnormality such as deterioration or failure of the actuator 18 is not occurring (e.g., an initial operating state of the actuator 18 immediately after installation or replacement thereof). The normal stroke time T3 n may be set beforehand by the operator, or may be stored in the first data storage unit 50 when the failure detecting device 14 is manufactured.

On the other hand, according to the second detailed example, whether or not a fault of the actuator 18 has occurred can be detected easily and in real time during operation of the actuator 18 (i.e., during reciprocal movement of the piston 32). More specifically, using actually calculated data of the stroke times T3, T3f, T3r, the statistical processor 52 sequentially calculates an average value AVE3, a standard deviation $\sigma 3$, or a variance $\sigma 3^2$ of the data, and stores the same as a statistically calculated value in the second data storage unit 54.

Further, based on a comparison between the statistically calculated value (the average value AVE3, the standard deviation $\sigma 3$, or the variance $\sigma 3^2$) and the normal value (the average value AVE3n, the standard deviation $\sigma 3n$, or the variance $\sigma 3n^2$) that are stored in the second data storage unit 54, and more specifically, by comparing the absolute value $\epsilon$AVE3, $\epsilon\sigma3$, or $\epsilon\sigma3^2$ of the deviation between the statistically calculated value and the normal value with the predetermined threshold value THAVE3, TH$\sigma$3, or TH$\sigma3^2$, the fault response detector 56 can judge sequentially whether a fault of the actuator 18 has occurred.

Further, if the actuator 18 becomes deteriorated, each time that the stroke time T3 is calculated based on the respective detection signals of the first sensor 20 and the second sensor 22, the variability in the average value AVE3, the standard deviation $\sigma3$, or the variance $\sigma3^2$ becomes greater. Thus, for example, if the absolute values $\epsilon$AVE3, $\epsilon\sigma3$, $\epsilon\sigma3^2$ corresponding to the average value AVE3, the standard deviation $\sigma3$, or the variance $\sigma3^2$ become greater than the predetermined thresholds THAVE3, TH$\sigma$3, TH$\sigma3^2$, it can easily be judged that a fault of the actuator 18 has occurred.

According to the second detailed example, by setting a calibration time to a fixed time period in an initial state of operation immediately after installation or replacement of the actuator 18 in the equipment, the normal value is calculated automatically, and is stored in the second data storage unit 54. Thus, setting of the normal value can be performed with high efficiency.

Further, by calculating as the stroke time T3 the time difference between the first time T1 and the second time T2, the stroke time T3 can be calculated easily and reliably.

Furthermore, in addition to a fault of the actuator 18, with the fault detection system 10, using the first time T1, a fault in the tubes 33, 35 between the directional switching valve 16 and the actuator 18 can be detected. The statistical calculation performed with respect to the first time T1 may be the same process (calculation of an average value, a standard deviation, or a variance) as the statistical calculation performed with respect to the stroke times T3, T3f, T3r.

Further, the controller 12, which is made up from a PLC or the like, supplies control signals to the solenoids 16*a*, 16*b* of the directional switching valve 16 through the failure detecting device 14, whereas the detection result of a fault in the actuator 18, etc., is input thereto as a detection signal from the failure detecting device 14. As a result, the controller 12 is capable of grasping (detecting) a fault of the actuator 18 or the like in an online state, and based on the detection result, can take an appropriate action such as stopping supply of the control signal.

Further, since the failure detecting device 14 detects a fault of the actuator 18, etc., and outputs the detection signal to the controller 12, it is unnecessary for the operator to create a control program for use by the controller 12 in order to detect a malfunction of the actuator 18 or the like. As a result, the load imposed on the operator to construct the fault detection system 10 can be reduced.

Further, by visually confirming the content displayed on the display device 60, the operator can grasp the occurrence or the like of a fault of the actuator 18, and can quickly carry out an appropriate action such as halting operation of the equipment, replacing the actuator 18, etc.

The fault detection system 10 according to the present invention is not limited to the embodiments described above, and various modified or additional structures may be adopted therein without deviating from the scope of the invention as set forth in the appended claims.

What is claimed is:

1. A fault detection system for an actuator having one end and an other end, based on a stroke time of a movable member of the actuator, comprising:

a first sensor disposed on the one end of the actuator along a displacement direction of the movable member, and which detects the movable member upon displacement thereof from the other end to the one end;

a second sensor disposed on the other end of the actuator along the displacement direction, and which detects the movable member upon displacement thereof from the one end to the other end;

a fault detecting device that judges a fault on the one end side or the other end side of the actuator based on detection results of the first sensor and the second sensor;

a directional switching valve that selectively supplies a pressure fluid to the one end or the other end of the actuator, based on an external control signal supplied thereto;

a first tube that connects the directional switching valve and the one end of the actuator and supplies the pressure fluid to the one end; and a second tube that connects the directional switching valve and the other end of the actuator and supplies the pressure fluid to the other end;

wherein the fault detecting device further comprises:

a stroke time calculator which calculates, as a stroke time required for the movable member to travel between the one end and the other end, a time difference between a first detection time from start of supply of the control signal to the directional switching valve until a time at which the movable member can no longer be detected by one of the first sensor and the second sensor, and a second detection time from the start of supply until a time at which detection of the movable member by the other of the first sensor and the second sensor is started, when the movable member is displaced in the displacement direction in accordance with the selective supply of the pressure fluid from the directional switching valve to the one end of the actuator via the first tube or from the directional switching valve to the other end of the actuator via the second tube;

a statistical computation processing unit that performs a predetermined statistical calculation with respect to one of the stroke time, the first detection time or the second detection time; and a fault detector which judges whether or not the fault on the one end side or the other end side has occurred, based on a processing result of the statistical computation processing unit, wherein when the statistical computation processing unit performs the predetermined statistical calculation with respect to the first detection time, the fault detector judges, based on a result of the predetermined statistical calculation with respect to the first detection time, whether the fault has occurred on the one end side or the other end side of the actuator.

2. The fault detection system according to claim 1, the fault detecting device further including a first storage unit in which one of the stroke time, the first detection time or the second detection time is stored, and a second storage unit in which the processing result is stored, wherein the fault detector reads out the processing result that is stored in the second storage unit, and judges whether or not the fault has occurred based on the read out processing result.

3. The fault detection system according to claim 2, wherein:

a normal stroke time of the movable member is stored beforehand as a normal value in the first storage unit;

the statistical computation processing unit calculates at least a deviation between the stroke time calculated by the stroke time calculator and the normal value, and stores the calculated deviation as a statistically calculated value in the second storage unit; and the fault detector reads out the statistically calculated value from the second storage unit, and judges whether or not the fault has occurred based on the read out statistically calculated value.

4. The fault detection system according to claim 2, wherein:

in a case that the first sensor and the second sensor detect the movable member each time that the movable member moves in the displacement direction, the stroke time calculator calculates and stores the stroke time in the first storage unit each time that respective detection results from the first sensor and the second sensor are input;

each time that the stroke time calculator calculates and stores the stroke time in the first storage unit, the statistical computation processing unit reads out data of all of the stroke times that are stored in the first storage unit, calculates an average value, a standard deviation, or a variance of the read out data, and stores the average value, the standard deviation, or the variance as a statistically calculated value in the second storage unit;

an average value, a standard deviation, or a variance of a normal stroke time of the movable member is stored as a normal value in the second storage unit; and each time that the statistical computation processing unit stores the statistically calculated value in the second storage unit, the fault detector reads out the statistically calculated value and the normal value from the second storage unit, and judges whether or not the fault has occurred based on a comparison between the statistically calculated value and the normal value.

5. The fault detection system according to claim 4, wherein:

in a case that the movable member is moved reciprocally along the displacement direction at a fixed time period from an initial state of operation of the actuator, the stroke time calculator calculates the stroke time of the movable member and stores the calculated stroke time in the first storage unit, each time that respective detection results from the first sensor and the second sensor are input; and the statistical computation processing unit reads out the data of all of the stroke times that are stored in the first storage unit, calculates an average value, a standard deviation, or a variance of the read out data, and stores the average value, the standard deviation, or the variance as a normal value in the second storage unit.

6. The fault detection system according to claim 2, wherein:

the stroke time calculator stores the first detection time, the second detection time, and the stroke time in the first storage unit;

the statistical computation processing unit performs a predetermined statistical calculation with respect to the first detection time, and stores a processing result of the statistical calculation in the second storage unit; and the fault detector reads out the processing result with respect to the first detection time that is stored in the second storage unit, and based on the read out processing result, judges whether or not the fault has occurred on the one end side or the other end side of the actuator.

7. The fault detection system according to claim 6, further comprising a controller that supplies the control signal to the directional switching valve, wherein the fault detecting device further includes an output processor that supplies the control signal from the controller to the directional switching valve, and outputs the detection result of the fault detector to the controller.

8. The fault detection system according to claim 2, further comprising a display device that displays one of the stroke time, the detection time or the second detection time stored in the first storage unit, the processing result stored in the second storage unit, and the detection result of the fault detector.

9. A fault detection system configured to detect a fault based on a stroke time of a movable member of the actuator, comprising:

a first sensor disposed on one end of the actuator along a displacement direction of the movable member, and which detects the movable member upon displacement thereof to the one end;

a second sensor disposed on another end of the actuator along the displacement direction, and which detects the movable member upon displacement thereof to the other end; and a fault detecting device that detects the fault based on detection results of the first sensor and the second sensor, wherein the fault detecting device further comprises:

a stroke time calculator, which calculates a stroke time required for the movable member to travel between the one end and the other end, based on each of the detection results;

a statistical computation processing unit that performs a predetermined statistical calculation with respect to the stroke time; and a fault detector, which detects whether or not the fault has occurred, based on a processing result of the statistical computation processing unit, wherein the fault detecting device further including a first storage unit in which the stroke time is stored, and a second storage unit in which the processing result is stored, wherein the fault detector reads out at least the processing result that is stored in the second storage unit, and detects whether or not the fault has occurred based on the read out processing result, further comprising a directional switching valve that selectively supplies a pressure fluid to the one end or the other end of the actuator, based on an external control signal supplied thereto, wherein:

the movable member is displaced in the displacement direction, in accordance with the selective supply of the pressure fluid to the one end or the other end of the actuator; and the stroke time calculator calculates as the stroke time of the movable member a time difference between a first detection time from start of supply of the control signal to the directional switching valve until a time at which the movable member can no longer be detected by one of the first sensor and the second sensor, and a second detection time from the start of supply until a time at which detection of the movable member by the other of the first sensor and the second sensor is started.

10. A fault detection system for an actuator configured to detect a fault based on a stroke time of a movable member of the actuator, comprising:

a first sensor disposed on one end of the actuator along a displacement direction of the movable member, and which detects the movable member upon displacement thereof to the one end;

a second sensor disposed on an other end of the actuator along the displacement direction, and which detects the movable member upon displacement thereof to the other end; and a fault detecting device that detects the fault based on detection results of the first sensor and the second sensor, wherein the fault detecting device further comprises:

a stroke time calculator, which calculates a stroke time required for the movable member to travel between the one end and the other end, based on each of the detection results;

a statistical computation processing unit that performs a predetermined statistical calculation with respect to the stroke time; and a fault detector, which detects whether or not the fault has occurred, based on a processing result of the statistical computation processing unit, further comprising a directional switching valve that selectively supplies a pressure fluid to the one end or the other end of the actuator, based on an external control signal supplied thereto, wherein:

the movable member is displaced in the displacement direction, in accordance with the selective supply of the pressure fluid to the one end or the other end of the actuator; and the stroke time calculator calculates as the stroke time of the movable member a time difference between a first detection time from start of supply of the control signal to the directional switching valve until a time at which the movable member can no longer be detected by one of the first sensor and the second sensor, and a second detection time from the start of supply until a time at which detection of the movable member by the other of the first sensor and the second sensor is started.

* * * * *